United States Patent
Mankowski et al.

(10) Patent No.: US 12,139,075 B2
(45) Date of Patent: Nov. 12, 2024

(54) VEHICLE WITH A PROTECTIVE WARNING SYSTEM

(71) Applicant: ACCELERATED SYSTEMS INC., Waterloo (CA)

(72) Inventors: Peter Mankowski, Cambridge (CA); Adam Crane, Fergus (CA); Willem Jager, Cambridge (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 0 days.

(21) Appl. No.: 17/908,964

(22) PCT Filed: Feb. 26, 2021

(86) PCT No.: PCT/IB2021/051646
§ 371 (c)(1),
(2) Date: Sep. 2, 2022

(87) PCT Pub. No.: WO2021/176317
PCT Pub. Date: Sep. 10, 2021

(65) Prior Publication Data
US 2023/0098779 A1     Mar. 30, 2023

Related U.S. Application Data

(60) Provisional application No. 62/984,551, filed on Mar. 3, 2020, provisional application No. 63/023,627, filed on May 12, 2020.

(51) Int. Cl.
*B60R 11/04*     (2006.01)
*B62J 50/21*     (2020.01)
(Continued)

(52) U.S. Cl.
CPC ............ *B60R 11/04* (2013.01); *B62J 50/21* (2020.02); *B62J 50/25* (2020.02); *G06V 20/56* (2022.01);
(Continued)

(58) Field of Classification Search
CPC ............ B60R 11/04; B60R 2300/107; B60R 2300/301; B60R 2300/8066; G06V 20/56; H04W 4/40
See application file for complete search history.

(56) References Cited

U.S. PATENT DOCUMENTS 10,077,007 B2 *   9/2018   Meyhofer ............... B60R 11/04
10,235,879 B2 *   3/2019   Im ........................... B60Q 1/543
(Continued)

FOREIGN PATENT DOCUMENTS

WO   WO-2015120428 A1   8/2015
WO   2019232264 A1      12/2019
(Continued)

OTHER PUBLICATIONS

PCT/IB2021/051646, a Vehicle With a Protective Warning System, Feb. 26, 2021.
(Continued)

*Primary Examiner* — John A Tweel, Jr.
(74) *Attorney, Agent, or Firm* — PERRY + CURRIER, INC.

(57) ABSTRACT

A protective warning system for a vehicle is provided. A device comprises: a long-range camera and a stereoscopic camera positioned in a housing to image external objects in a rear-facing direction when the housing is mounted to a vehicle. A controller detects, using images from the long-range camera, an external object in the rear-facing direction and processes stereoscopic images from the stereoscopic camera to determine when the external object is located (Continued)

within a first zone or a second zone extending in the rear-facing direction, the second zone being closer to the stereoscopic camera than the first zone. In response to determining that the external object is located within the first zone or the second zone, the controller controls the one or more notification devices to provide one or more first or second notifications associated with a first or second urgency level.

25 Claims, 14 Drawing Sheets

(51) Int. Cl.
 B62J 50/25 (2020.01)
 G06V 20/56 (2022.01)
 H04W 4/40 (2018.01)
(52) U.S. Cl.
 CPC ......... *H04W 4/40* (2018.02); *B60R 2300/105* (2013.01); *B60R 2300/107* (2013.01); *B60R 2300/301* (2013.01); *B60R 2300/8066* (2013.01)

(56) References Cited

U.S. PATENT DOCUMENTS

| | | | |
|---|---|---|---|
| 11,025,890 B2* | 6/2021 | Choi | G01S 17/89 |
| 11,623,707 B2* | 4/2023 | Champoux | B62J 45/4151 |
| | | | 701/301 |
| 2013/0311075 A1* | 11/2013 | Tran | B60Q 1/535 |
| | | | 701/117 |
| 2015/0228066 A1 | 8/2015 | Farb | |

FOREIGN PATENT DOCUMENTS

| | | |
|---|---|---|
| WO | 2019239402 A1 | 12/2019 |
| WO | 2020041191 A1 | 2/2020 |

OTHER PUBLICATIONS

Butler, Jeffrey, Examiner "International Search Report", mailed May 28, 2021, issued in corresponding PCT Application No. PTO/IB/2021/051646, filed Feb. 26, 2021.

\* cited by examiner

VEHICLE WITH A PROTECTIVE WARNING SYSTEM

CROSS-REFERENCE TO RELATED APPLICATIONS

The present specification claims priority from U.S. Provisional Patent Application No. 62/984,551, filed Mar. 3, 2020, and further claims priority from U.S. Provisional Patent Application No. 63/023,627, filed May 12, 2020, the contents of each being incorporated herein by reference.

BACKGROUND

Bicycles, electric bikes, and the like, are becoming a popular mode of transportation for people. Transportation using bicycles, and the like can be potentially dangerous given the environment it is used in.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Figure 1:
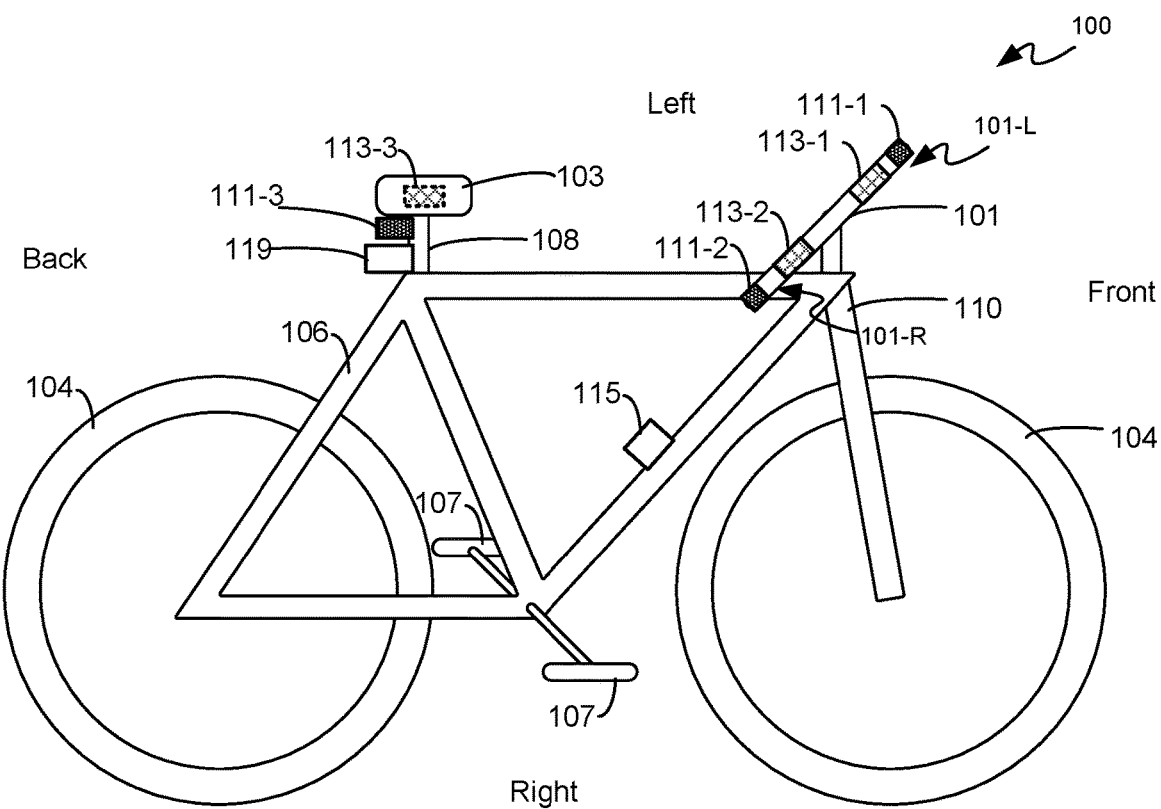
FIG. 1 depicts a side view of a vehicle with a protective warning system (with handlebars depicted in a perspective view), according to non-limiting examples.

Bicycles, electric bikes, and the like, are becoming a popular mode of transportation for people. Transportation using bicycles, and the like can be potentially dangerous given the environment it is used in. Vehicles, intersections, people, and environmental objects and obstacles may pose a danger to a rider. Hence, provided herein are vehicles with various protective warning systems. One protective warning system includes one or more object sensors that detect objects around a vehicle and provide feedback to a rider of the vehicle using haptic devices in handlebars of the vehicle, a seat of the vehicle and/or any other suitable location where a rider of the vehicle may feel haptic feedback of the haptic devices. The haptic feedback may be binary such that the haptic feedback is provided when an object is detected or not provided when an object is not detected. However, the haptic feedback may indicate a direction of an object relative to the vehicle, such that the vehicle may be controlled by the rider to avoid the object. The vehicle may include a warning light, which may be backward facing, and/or any suitable notification device, which may be controlled to provide visual indications in a direction of a detected object; for example, the detected object may be another vehicle, such as a car, a truck and the like, driven by a driver and/or the detected object may be an autonomous vehicle; the visual indications may indicate to the driver and/or the autonomous vehicle that they are approaching the present vehicle such that the detected vehicle may be controlled to avoid the present vehicle.

Another protective warning system for a vehicle includes a long-range camera and a stereoscopic camera that detects when objects are within a first zone or a second zone that is closer to the vehicle than the first zone; when the object is in the first zone, one or more notification devices are controlled to provide one or more first notifications associated with a first urgency level, and when the object is in the second zone, the one or more notification devices are controlled to provide one or more second notifications associated with a second urgency level greater than the first urgency level. Hence, for example, the protective warning system may detect that a car, a truck, and the like, using the long range camera and use the location of the car, truck and the like, as detected in the field of view of the long-range camera to look for the car, truck, and the like, in the field of view of the stereoscopic camera. Hence, the images from the long-range camera may be used as a kind of filter and/or as an early detection mechanism for cars, trucks and the like. Stereoscopic images from the stereoscopic camera may be used to determine when the car, truck, and the like is in the first zone or the second zone, and the one or more notification devices controlled accordingly. The notifications associated with the different urgencies may increase in intensity, frequency, and the like, as the associated urgency increases; indeed, while urgency is a relative term, herein, "urgency" may be understood to mean a classification of notifications which increase in intensity, frequency and the like according to the associated urgency and/or classification. As such, when the car, truck, and the like, approaches the vehicle in the first zone, a rider may be warned of such so that the rider may be aware of the car, truck, and the like and take corrective action; similarly, when the car, truck, and the like, is closer the vehicle in the second zone, a rider may be warned of such using more urgent-type notifications, so that the rider may more urgently respond, for example to avoid a collision, and the like. Furthermore, when the car, truck, and the like, is in the second zone, the protective warning system may store images and/or stereoscopic images from the cameras at a memory, and may perform image analysis to extract and store given information from the images and/or stereoscopic images, such as a license plate number, details of the car, truck and the like (e.g. color, make, model), and the like. As such, the protective warning system may act as a kind of "black box" so that information regarding dangerous driving, and the like, of cars, truck and the like around the vehicle are recorded; indeed, in some examples, the protective warning system may include one or more of an accelerometer, a gyroscope and a barometric pressure sensor, and data from such may also be stored. The notifications devices may include the aforementioned haptic devices and/or external notification devices such as a mobile phone, a smart watch, and the like.

Furthermore, aspects of the various protective warning systems may be combined such that the haptic devices may be used to provide haptic feedback that indicates a direction of an object relative to a vehicle and/or an indication of whether an object is in the first zone or second zone.

An aspect of the present specification provides a vehicle comprising: handlebars; a seat for a rider; one or more object sensors arranged on the vehicle to sense objects around the vehicle; one or more haptic devices located at one or more of the handlebars and the seat; and a controller in communication with the one or more object sensors and the haptic devices, the controller configured to: determine, using the one or more object sensors, that an object has been detected; and in response, control the one or more haptic devices to provide an indication of the object being detected.

Another aspect of the present specification provides a vehicle comprising: handlebars; a seat for a rider; a long-range camera positioned to image external objects in a rear-facing direction; a stereoscopic camera positioned to image the external objects in the rear-facing direction, the long-range camera having a focal length longer than a respective focal length of the stereoscopic camera; and a controller in communication with the long-range camera and the stereoscopic camera, the controller in further communication with one or more notification devices, the controller configured to: detect, using images from the long-range camera, an external object in the rear-facing direction; in response to detecting the external object, using the images from the long-range camera, process stereoscopic images from the stereoscopic camera to determine when the external object is located within a first zone or a second zone extending in the rear-facing direction, the second zone being closer to the stereoscopic camera than the first zone; in response to determining that the external object is located within the first zone, control the one or more notification devices to provide one or more first notifications associated with a first urgency level; in response to determining that the external object is located within the second zone, control the one or more notification devices to provide one or more second notifications associated with a second urgency level greater than the first urgency level.

Another aspect of the present specification provides a housing mountable to a vehicle; a long-range camera positioned in the housing to image external objects in a rear-facing direction when the housing is mounted to the vehicle; a stereoscopic camera positioned in the housing to image the external objects in the rear-facing direction when the housing is mounted to the vehicle, the long-range camera having a focal length longer than a respective focal length of the stereoscopic camera; a communication interface; and a controller in the housing, the controller in communication with the long-range camera and the stereoscopic camera, the controller in further communication with one or more notification devices via the communication interface, the controller configured to: detect, using images from the long-range camera, an external object in the rear-facing direction; in response to detecting the external object, using the images from the long-range camera, process stereoscopic images from the stereoscopic camera to determine when the external object is located within a first zone or a second zone extending in the rear-facing direction, the second zone being closer to the stereoscopic camera than the first zone; in response to determining that the external object is located within the first zone, control the one or more notification devices to provide one or more first notifications associated with a first urgency level; in response to determining that the external object is located within the second zone, control, via the communication interface, the one or more notification devices to provide one or more second notifications associated with a second urgency level greater than the first urgency level.

Figure 2:
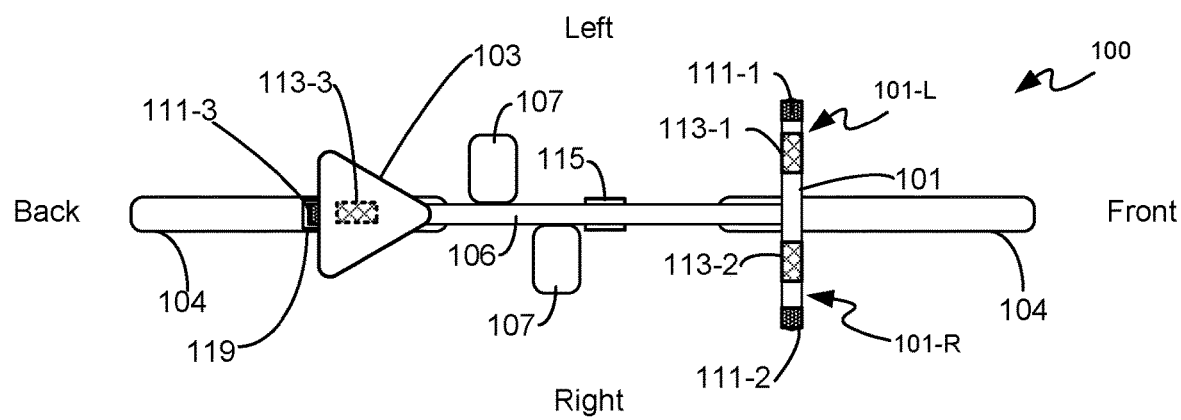
FIG. 2 depicts a top view of the vehicle with a protective warning system, according to non-limiting examples.
Figure 3:
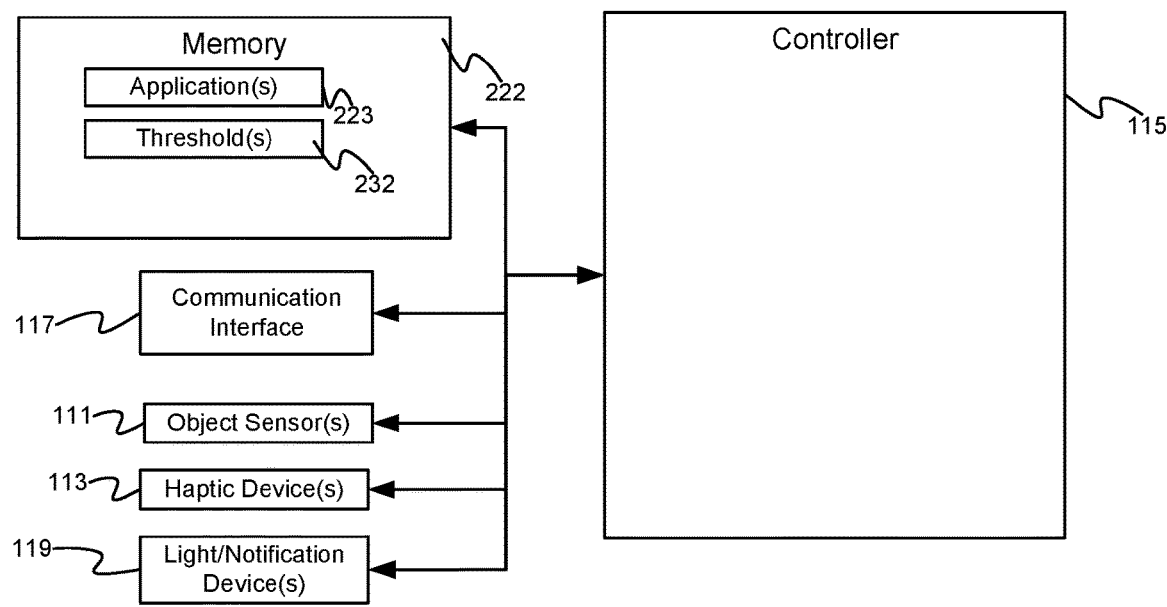
FIG. 3 depicts a block diagram of electronic components of the vehicle of FIG. 1, according to non-limiting examples.

FIG. 1 and FIG. 2, schematically depict a side and top view of a vehicle 100, and FIG. 3 depicts a schematic block diagram of electronic components of the vehicle 100. With reference to FIG. 1 and FIG. 2 the vehicle 100 includes handlebars 101 and a seat 103 for a rider (not depicted). In FIG. 1, the handlebars 101 are schematically depicted in perspective to show details thereof.

As depicted, the vehicle 100 comprises a bicycle that includes two wheels 104, a frame 106, pedals 107, a seat-post 108, a fork 110, and the like, however the vehicle 100 may comprise any suitable vehicle which includes handlebars and a seat for a rider including, but not limited to, a tricycle, a quadracycle, an all-terrain vehicle (ATV), a motorcycle, an e-bike, an electric vehicle, a snowmobile (e.g. with treads instead of wheels), a farming vehicle, farming machinery, a construction vehicle, construction machinery, and the like, which moves using any suitable combination of wheels, treads, motors, pedals, and the like.

For clarity, in FIG. 1 and FIG. 2, front, back, left and right directions of the vehicle 100 are indicated; for example, the handlebars 101 are located towards the front at the vehicle 100, and the left and right sides are relative to a rider sitting on the seat 103 facing the front of the vehicle 100.

Furthermore, as depicted, the handlebars 101 comprise a left handlebar 101-L and a right handlebar 101-R, which may be continuous with each other and/or separately attached to the fork 110 of the vehicle 100 (e.g. which, as depicted) extends from the handlebars 101 to a front wheel 104 of the vehicle 100.

The vehicle 100 further includes one or more object sensors 111-1, 111-2, 111-3 arranged on the vehicle 100 to sense objects around the vehicle 100. The object sensors 111-1, 111-2, 111-3 are interchangeably referred to hereafter, collectively, as the object sensors 111 and, generically, as an object sensor 111. Such a convention will be used elsewhere in the present specification.

For example, as depicted the vehicle 100 includes three object sensors 111: a left and/or first object sensor 111-1 located at the left handlebar 101-L facing in a leftward direction, relative to a front of the vehicle 100; a right and/or second object sensor 111-2 located at the right handlebar 101-R facing in a rightward direction relative to the front of the vehicle 100; and a back and/or third object sensor 111-3 facing in a backward direction, relative to the front of the vehicle 100.

However, the third object sensor 111-3 may be optional. As depicted, the third object sensor 111-3 is located at the seat-post 108 of the vehicle 100, however the third object sensor 111-3 is located may be located at one or more of the frame 106 of the vehicle 100, the seat-post 108 of the vehicle 100, the seat 103 of the vehicle 100, under the seat 103 of the vehicle 100 (e.g. mounted under the seat 103) and/or in any other suitable position.

Similarly, while the object sensors 111-1, 111-2 are depicted as being located at the handlebars 101 (e.g. at respective opposing ends of the handlebars 101), the object sensors 111-1, 111-2 may be located at any suitable position at the vehicle 100.

Furthermore, while three object sensors 111 are depicted, the vehicle 100 may comprise any suitable number of object sensors 111 including as few as one object sensor 111 and more than three object sensors 111. Furthermore, the object sensors 111 may be located at any suitable positions at the vehicle 100 to detect objects around the vehicle 100. Furthermore, while the depicted arrangement of object sensors 111 are to detect objects in leftward, rightward and backward directions, in other examples, the object sensors 111 may be arranged to further detect objects in a frontward direction.

In particular, the object sensors 111 may be arranged such that triangulation techniques may be used to detect a direction of an object from the vehicle 100. However, in other examples, the object sensors 111 may be configured to detect a direction of an object from the vehicle 100 (e.g. without triangulation).

The object sensors 111 may include any suitable sensors configured to detect objects around the vehicle 100 including, but not limited to, any suitable combination of ultrasonic sensors, cameras, Red-Green-Blue (RGB) cameras, depth cameras, stereoscopic cameras, thermal cameras, infrared (IR) cameras, radar (Radio Detection and Ranging) devices, microwave doppler radar motion sensor devices (and/or any suitable microwave sensor device and/or doppler radar device), laser devices (e.g. Light Detection and Ranging (LiDAR) devices), speaker/microphone combinations and the like.

In some examples, the one or more object sensors 111 may comprise three ultrasonic sensors arranged on the vehicle 100 for use in object triangulation by the controller 115 to estimate one or more of distance and location of an object, for example based on data received from each of the three ultrasonic sensors. In some of these examples, the controller 115 may be further configured to one or more of disable at least one of the one or more object sensors 111 (e.g. at least one of the one or more ultrasonic sensors) and/or place data therefrom on hold to avoid cross-talk and/or radio-frequency cross-talk therebetween.

As depicted, the vehicle 100 further comprises one or more haptic devices 113-1, 113-2, 113-3 (e.g. haptic devices 113 and/or a haptic device 113) located at one or more of the handlebars 101 and the seat 103 and/or any suitable position at the vehicle 100 where a rider of the vehicle 100 (e.g. sitting on the seat 103 and gripping the handlebars 101) may feel haptic feedback of the haptic devices 113 (e.g. at the handlebars 113 and/or the seat 103 and/or any suitable position at the vehicle 100). The haptic devices 113 may comprise vibratory motors, and the like and/or any other suitable haptic devices.

Furthermore, a rider of the vehicle 100, as used herein, may comprise any operator and/or user and/or driver of the vehicle 100. In some examples, a rider of the vehicle 100 may include a passenger of the vehicle 100. Indeed, a rider of the vehicle 100 may include any person, and the like, who may interact with the vehicle 100 to feel haptic feedback of the haptic devices 100 as described herein.

While the haptic devices 113 are depicted as on the surface of the handlebars 101, is understood that the haptic devices 113 may be located within the handlebars 101 and/or within grips thereof.

As depicted, the haptic devices 113 comprise at least one left and/or first haptic device 113-1 located at the left handlebar 101-L, and at least one right and/or second haptic device 113-2 located at the right handlebar 101-R. In general, a rider of the vehicle 100 gripping the handlebars 101 may feel the left handlebar 101-L vibrate when the first haptic device 113-1 is activated, and the rider of the vehicle 100 gripping the handlebars 101 may feel the right handlebar 101-R vibrate when the second haptic device 113-2 is activated. Similarly, the rider of the vehicle 100 gripping the handlebars 101 may feel the both handlebars 101 vibrate when both haptic devices 113-1, 113-2 are activated.

Similarly, as depicted, the haptic devices 113 comprise at least one back and/or third haptic device 113-3 located at the seat 103 such that the rider of the vehicle 100 sitting on the seat 103 may feel the seat 103 vibrate when the third haptic device 113-3 is activated. In FIG. 1 and FIG. 2, the third haptic device 113-3 is depicted in broken lines to indicate that the third haptic device 113-3 may be in and/or under the seat 103.

In some examples, the third haptic device 113-3 is optional, however, the haptic devices 113-1, 113-2 may also be optional as long as the vehicle 100 includes one or more haptic devices 113 that a rider of the vehicle 100 may feel when activated.

As depicted, the vehicle 100 further includes a controller 115 in communication with the one or more object sensors 111 and the haptic devices 113, using any suitable combination of wired (e.g. wires through the frame 106, the handlebars 101 and/or the seat-post 108, and the like) and/or wireless communication links. While such communication links are not depicted in FIG. 1 and FIG. 2, they are nonetheless understood to be present. In particular, FIG. 3 depicts the controller 115 in communication with the one or more object sensors 111 and the haptic devices 113.

As depicted, the controller 115 may be located within the frame 106, however the controller 115 may be located in and/or on any suitable position at the vehicle 100. For example, the controller 115 may be contained in a housing with a battery (e.g. when the vehicle 100 comprises an electric vehicle) and attached to the frame 106, amongst other possibilities.

The controller 115 may comprise a processor and/or a plurality of processors, including but not limited to one or more central processors (CPUs) and/or one or more graphics processing units (GPUs) and/or one or more processing units; either way, the controller 115 comprises a hardware element and/or a hardware processor. Indeed, in some implementations, the controller 115 can comprise an ASIC (application-specific integrated circuit) and/or an FPGA (field-programmable gate array) specifically configured for controlling haptic devices based on data received from object sensors. Hence, the controller 115 may not be a generic controller, but a device specifically configured to implement specific functionality for controlling haptic devices based on data received from object sensors. For example, the controller 115 can specifically comprise a computer executable engine configured to implement functionality for controlling haptic devices based on data received from object sensors.

As will be described in more detail hereafter, the controller 115 may be configured to: determine, using the one or more object sensors 111, that an object has been detected; and in response, control the one or more haptic devices 113 to provide an indication of the object being detected.

In some examples, the one or more object sensors 111 may be configured to detect distances of objects therefrom, and the controller 115 may be further configured to: determine a distance of an object to the vehicle 100; in response to the distance being less than a threshold distance, control the one or more haptic devices 113 to provide an indication of the object being detected; and in response to the distance being greater than the threshold distance, refrain from controlling the one or more haptic devices 113 to provide the indication of the object being detected.

In some examples, the vehicle 100 may further comprise a communication interface 117 (e.g. see FIG. 3), and the controller 115 may be further configured to: receive, via the communication interface 117, the threshold distance from one or more of a cloud device and a mobile device. For example, the rider of the vehicle 100 may use their mobile device (e.g. via a suitable application and/or "app") to set and transmit the threshold distance to the controller 115 directly and/or via a cloud device. For example, the threshold distance may be smaller in some environments (e.g. on a city street) and larger in other environments (e.g. on a highway). In yet further examples, the threshold distance may be location based and the controller 115 may be configured to determine a location of the vehicle 100 (e.g. via a GPS device, and the like) and select a suitable threshold distance based on the location.

In a simple example, when an object is detected, the haptic devices 113 are controlled to vibrate to indicate to a rider of the vehicle 100 that an object has been detected (e.g. within a threshold distance) to alert the rider to the presence of the object.

However, in another example, the controller 115 may be further configured to: determine, using the object sensors 111 (including, but not limited to, the first object sensor 111-1, the second object sensor 111-2 and the third object sensor 111-3), a direction of the object relative to the vehicle 100; and control the at least one left and/or first haptic device 113-1 and the at least one right and/or second haptic device 113-2 such that the indication provided includes a directional indication of the direction of the object.

In particular examples that include only the haptic devices 113-1, 113-2 (e.g. at least one left haptic device 113-1 and at least one right haptic device 113-2), the controller 115 may be further configured to in response to the direction being in the leftward direction, control the at least one left haptic device 113-1 to provide the indication, while the at least one right haptic device 113-2 is not controlled to provide the indication; in response to the direction being in the rightward direction, control the at least one right haptic device 113-2 to provide the indication, while the at least one left haptic device 113-1 is not controlled to provide the indication; and in response to the direction being in the backward direction, control both the at least one left haptic device 113-1 and the at least one right haptic device 113-2 to provide the indication. Hence, the left haptic device 113-1 vibrating may indicate an object detected in a leftwards direction, the right haptic device 113-2 vibrating may indicate an object detected in a rightwards direction, and both haptic devices 113-1, 113-2 vibrating may indicate an object detected in a backwards direction.

However, when the rear and/or third haptic device 113-3 is present, the controller 115 may be further configured to, in response to the direction being in the backward direction, control rear haptic device 113-3 to provide the indication, such that the third haptic device 113-3 vibrating indicates an object detected in a backwards direction.

In some examples, an object may be detected by only the left and/or first object sensor 111-1 and the left and/or first haptic device 113-1 is controlled to vibrate, and/or an object may be detected by only the right and/or second object sensor 111-2 and the right and/or second haptic device 113-2 is controlled to vibrate. When the third object sensor 111-3 is present, an object may be detected by only the back and/or third object sensor 111-3 and both haptic devices 113-1, 113-2 are controlled to vibrate, and/or the third haptic device 113-3 is controlled to vibrate.

In yet further examples, a more precise direction of the object may be determined (e.g. via triangulation via the three object sensors 111) and the vibration of the haptic devices 113 may be controlled relative to each other to provide an indication of direction. For example, when the detected object is the left and back of the vehicle, both haptic devices 113-1, 113-3 may be controlled to vibrate, and/or depending on the direction, the haptic devices 113-1, 113-3 may be controlled to different intensities. For example, when an object is more leftward than backward, the left haptic device 113-1 may be controlled to vibrate stronger than the back haptic device 113-3. Indeed, any suitable scheme for controlling the haptic devices 113 to indicate direction is within the scope of the present specification.

In yet further examples, the controller 115 may be further configured to: determine one or more of: a rate of change of the distance; a velocity of the object; an acceleration of the object; inertia of the object; the momentum of the object; and an estimated time of impact of the object at the vehicle 100; and control the one or more haptic devices 113 to provide the indication as a function of one or more of: the rate of change of the distance, the velocity of the object; the acceleration of the object; the inertia of the object; the momentum of the object; and the estimated time of impact of the object at the vehicle 100. However, any suitable distance and/or movement based parameter is within the scope of the present specification. Furthermore, control of the haptic devices 113 based on one or more of a rate of change of the distance, a velocity of the object, an acceleration of the object, inertia of the object, the momentum of the object and an estimated time of impact of the object at the vehicle 100 may also be threshold based. In examples where the inertia and/or momentum of the object are used, the controller 115 may be configured to estimate a mass of a detected object (e.g. based on size and the like, for example based on image data, radar data, microwave doppler radar motion sensor data (and/or any suitable microwave sensor data and/or doppler radar data), LiDar data and the like).

For example, the controller 115 may be further configured to: control the one or more haptic devices 113 to provide the indication by controlling one or more of intensity, frequency, and pattern of vibrations of the haptic devices 113. Hence, for example, as the object gets closer to the vehicle 100, the haptic devices 113 may be controlled to provide stronger vibrations and/or faster vibrations and/or patterns of vibrations that are associated with urgency. Put another way, as the object gets closer to the vehicle and/or its velocity, and the like, increases, the vibration of the haptic devices 113 may increase.

In some examples, the rider of the vehicle 100 may set the intensity, frequency, and pattern of vibrations of the haptic devices 113 to use via a mobile device (e.g. via a suitable application and/or "app") and/or a cloud device to select one or more of intensity, frequency, and pattern of vibrations of the haptic devices 113 to use to provide the indications (e.g. via the communication interface 117).

As depicted, the vehicle 100 further includes at least one notification device 119 and specifically a backward facing light (interchangeably referred to hereafter as the light/notification devices 119). As depicted, the light/notification devices 119 are mounted to the seat-post 108, however the light/notification devices 119 may be located at any suitable position at the vehicle 100. The light/notification devices 119 may be used to provide indications and/or notifications to another vehicle approaching the vehicle 100; for example, the controller 115 may be further configured to: determine, using the one or more object sensors 111, that an object has been detected; and in response, control the light/notification devices 119 to provide an indication of the object being detected, to indicate the vehicle 100 to a driver of the other vehicle (and/or an autonomous vehicle), for example as a warning to be cautious of the vehicle 100.

However, the vehicle 100 may comprise any suitable number of one or more visual notification devices, and the controller 115 may be further configured to: in response to an object being detected, control the one or more visual notification devices to provide a visual notification in an outward direction from the vehicle 100.

In particular, the controller 115 may be further configured to: determine, using the one or more object sensors 111, a direction of the object relative to the vehicle 100; and control the one or more visual notification devices to provide the visual notification in the direction of the object. Hence, in a simplest example, when an object is detected in a backwards direction, the light/notification devices 119 may be controlled to provide a visual notification.

However, the vehicle 100 may comprise visual notification devices facing leftward and rightward and when an object is detected in a leftward or rightward direction, respective leftward or rightward facing visual notification devices may be controlled accordingly to provide a respective visual notification.

Similar to the haptic devices 113 being controlled as a function of distance, the controller 115 may be configured to control the one or more visual notification devices (e.g. the light/notification devices 119) in a distance-based manner. Hence, for example, the light/notification devices 119 may be controlled to provide a visual notification when an object is detected in a backwards direction and/or by the third object sensor 111-3, and when the distance to the object is decreasing and/or the velocity is increasing, and the like, the light/notification devices 119, and/or the one or more visual notification devices may be controlled to different frequencies, colors, patterns, and the like (e.g. to simulate lights from a police vehicle, and the like).

Put another way, when the one or more object sensors 111 are configured to detect distances of the objects therefrom, the controller 115 may be further configured to: determine one or more of a distance of the object to the vehicle 100 and a velocity of the object; and control the backward facing light/notification devices 119 based on one or more of the distance and the velocity of the object by one or more of: turning the backward facing light/notification devices 119 on; controlling an intensity of the backward facing light/notification devices 119; controlling strobing of the backward facing light/notification devices 119; controlling strobing patterns of the backward facing light/notification devices 119; controlling color of the backward facing light/notification devices 119; and the like.

Similar to the haptic devices 113 being controlled as a function of threshold, the controller 115 may be configured to control the one or more visual notification devices (e.g. the light/notification devices 119) in a threshold-based manner. Hence, for example, the light/notification devices 119 may be controlled to provide a visual notification when an object detected in a backwards direction is within a threshold distance from the vehicle 100 and/or the third object sensor 111-3. Similarly, when the distance to the object is decreasing and/or the velocity is increasing, and the like, the light/notification devices 119, and/or the one or more visual notification devices may be controlled to different frequencies, colors, patterns, and the like (e.g. to simulate lights from a police vehicle, and the like).

Put another way, the controller 115 may be further configured to: in response to determining one or more of that: a distance of an object to one or more of the one or more object sensors 111 is decreasing; the distance is less than a threshold distance; a rate of change of the distance is increasing; and the rate of change of the distance is above a threshold rate of change: control the one or more visual notification devices (e.g. the light/notification devices 119) to provide a visual notification according to one or more of: the distance and the rate of change.

In particular, with reference to the light/notification devices 119 comprising a backward facing visual device, facing in a backward direction, relative to a front of the vehicle 100, and the controller 115 may be further configured to: in response to one or more of determining that an object is detected in the backward direction, relative to the front of the vehicle 100, control the backward facing visual device to provide a visual notification. Furthermore, the controller 115 may be further configured to control the backward facing visual device to provide a visual notification according to one or more of: a distance of the object to the vehicle 100 and a rate of change of the distance.

However, the vehicle 100 may comprise any suitable type of notification device. For example, the vehicle 100 may comprise one or more aural notification devices, such as one or more speakers and the like. In these examples, the controller 115 may be further configured to: in response to an object being detected, control the one or more aural notification devices to provide an aural notification thereof (e.g. to provide a simulation of a police and/or fire truck siren, and the like).

A person skilled in the art by now understands that, together, the one or more object sensors 111, the one or more haptic devices 113, the controller 115, and optionally the one or more notification device 119, comprise a protective warning system of the vehicle 100

Attention is next directed to FIG. 3 which depicts a block diagram of electronic components of the vehicle 100 which, together, may form a protective warning system for the vehicle 100. In particular, FIG. 3 depicts the controller 115 in communication with the one or more object sensors 111, the one or more haptic devices 113, the communication interface 117, the one or more light/notification devices 119, and a memory 222, for example via a computer bus, and the like. The communication interface 117 and the memory 222 may be located at any suitable position at the vehicle 100 including, but not limited to, within and/or on the frame 106, and/or in a housing with the controller 115. Furthermore, the controller 115, the communication interface 117 and the memory 222 may be distributed at the vehicle 100.

As depicted, the memory 222 stores an application 223 and optionally one or more threshold conditions 232 (e.g. the threshold distances, and the like referred to above).

The communication interface 117 comprises any suitable wired or wireless communication interface including, but not limited to, a WiFi™ communication interface, a Bluetooth™ communication interface, a cell phone communication interface, and the like.

The memory 222 may comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the controller 115 as described herein are typically maintained, persistently, in the memory 222 and used by the controller 115 which makes appropriate utilization of volatile storage during the execution of such programming instructions. Those skilled in the art recognize that the memory 222 is an example of computer readable media that can store programming instructions executable on the controller 115. Furthermore, the memory 222 is also an example of a memory unit and/or memory module and/or a non-volatile memory.

In particular, the memory 222 stores the application 223 that, when processed by the controller 115, enables the controller 115: determine, using the one or more object sensors 111, that an object has been detected; and in response, control the one or more haptic devices 113 to provide an indication of the object being detected.

The application 223 may include numerical algorithms, and/or programmed algorithms, predetermined algorithms, and/or static algorithms configured to control a protective warning system of a vehicle.

Alternatively, and/or in addition to numerical algorithms, and/or programmed algorithms, predetermined algorithms, and/or static algorithms, the application 223 may include machine learning models and/or algorithms, and the like, which have been trained to control a protective warning system of a vehicle. Furthermore, in these examples, the application 223 may initially be operated by the controller 115 in a training mode to train the machine learning models and/or algorithms of the application 223 to perform the above described functionality and/or generate classifiers therefor.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like.

However, as data stored by the controller 115 may later be used in court proceedings, generalized linear regression algorithms, random forest algorithms, support vector machine algorithms, gradient boosting regression algorithms, decision tree algorithms, generalized additive models, and the like may be preferred in present examples over neural network algorithms, deep learning algorithms, evolutionary programming algorithms, and the like. In particular, generalized linear regression algorithms, random forest algorithms, support vector machine algorithms, gradient boosting regression algorithms, decision tree algorithms, generalized additive models, and the like may be preferred in some public safety environments, such as courts. Regardless, any suitable machine learning algorithm and/or deep learning algorithm and/or neural network is within the scope of present examples.

Figure 4:
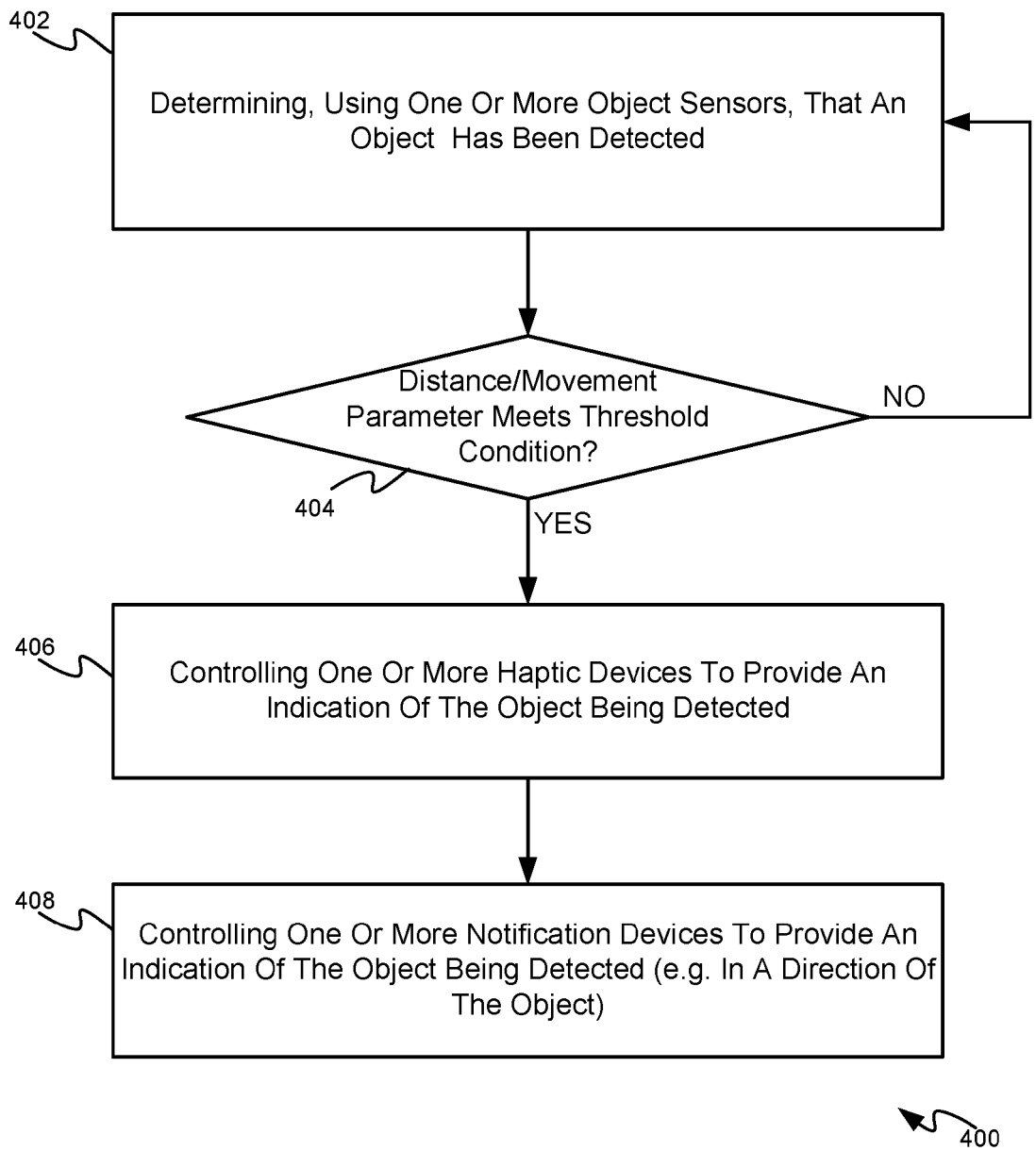
FIG. 4 depicts a flowchart of a method for controlling a protective warning system of the vehicle of FIG. 1, according to non-limiting examples.

Attention is now directed to FIG. 4 which depicts a flowchart representative of a method 400 for controlling a protective warning system of a vehicle. The operations of the method 400 of FIG. 4 correspond to machine readable instructions that are executed by the controller 115. In the illustrated example, the instructions represented by the blocks of FIG. 4 are stored at the memory 222 for example, as the application 223. The method 400 of FIG. 4 is one way in which the controller 115 and/or the vehicle 100 may be configured. Furthermore, the following discussion of the method 400 of FIG. 4 will lead to a further understanding of the vehicle 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the vehicle 100 of FIG. 1, as well.

At a block 402, the controller 115 determines, using one or more object sensors 111, that an object has been detected, as described above.

At an optional block 404, the controller 115 may compare one or more distance parameters and/or movement parameters to a respective threshold condition 232. For example, a distance of the object to the vehicle 100 may be compared to a threshold distance to determine whether the distance is less than the threshold distance, and/or a velocity of the object may be compared to a threshold velocity to determine whether the velocity of the object is greater than a threshold velocity (e.g. and the object is moving towards the vehicle 100). In response to one or more distance parameters and/or movement parameters meet a respective threshold condition 232 (e.g. a distance is less than a threshold distance and/or a velocity is greater than a threshold velocity and the like, such that a "YES" decision occurs at the bock 404), at a block 406, the controller 115 controls the one or more haptic devices 113 to provide an indication of the object being detected, as described above.

At an optional bock 408, which may be implemented before the block 406, after the block 406 and/or in conjunction with the block 406, the controller 115 controls one or more notification devices (e.g. the notification device 119) to provide an indication of the object being detected (e.g. and which may be in a direction of the object, as described above). The notification of the block 408 may comprise a visual and/or aural notification.

Figure 5:
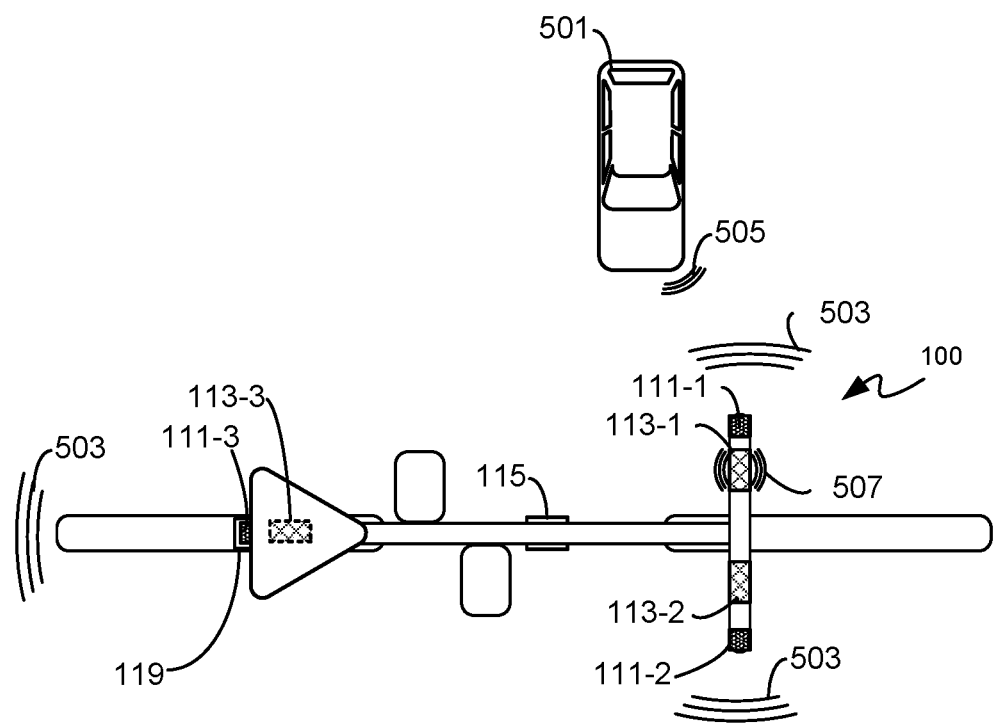
FIG. 5 depicts an example of the protective warning system in operation.
Figure 6:
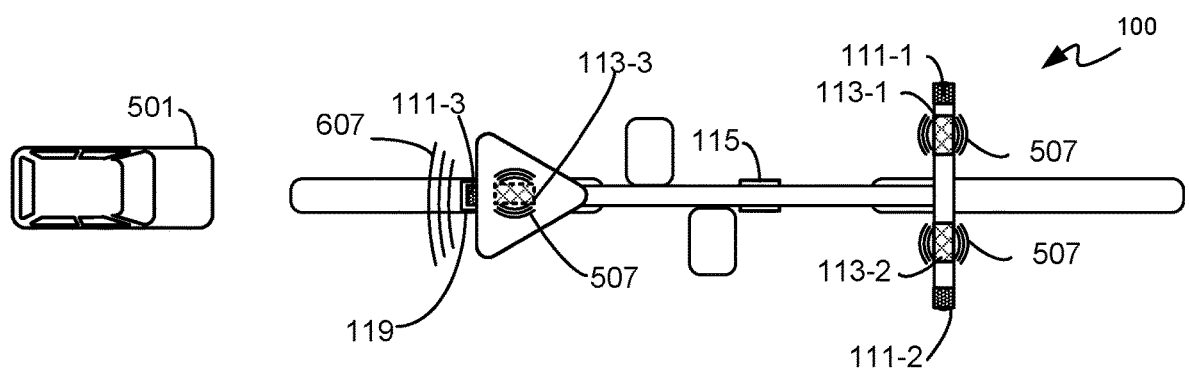
FIG. 6 depicts another example of the protective warning system in operation.

Attention is next directed to FIG. 5 and FIG. 6 which depict examples of the method 400 with the vehicle 100. In particular, FIG. 5 and FIG. 6 are each similar to FIG. 2, with like components having like numbers. Furthermore, while not all components of the vehicle 100 are numbered, they are nonetheless understood to be present. Furthermore, the examples of FIG. 5 and FIG. 6 are described with reference to the object sensors 111 comprising ultrasonic sensors.

Furthermore, in FIG. 5 and FIG. 6 a car 501 (e.g. an object) is approaching the vehicle 100; in particular, in FIG. 5, the car 501 is approaching the vehicle 100 from a leftwards side, and in FIG. 6, the car 501 is approaching the vehicle 100 from a backwards side.

In particular, in FIG. 5, each of the object sensors 111 are emitting a respective signal 503, such as ultrasonic sound, and the like. However, as the car 501 is at a leftwards side, only the signal 503 from the left object sensor 111-1 is reflected from the car 501, as depicted as a reflected signal 505, which is detected by the object sensor 111-1 and data indicating detection thereof is received at the controller 115 (e.g. at the block 402). In response the controller 115 controls (e.g. at the block 406) the left haptic device 113-1 to vibrate 507. While an example of the block 404 is not depicted, it is understood that the controller 115 may estimate a distance of the car 501 to the vehicle 100 via a time difference between a time that the signal 503 was emitted from the left object sensor 111-1 and a time that the reflected signal 505 was received, which may be compared to a threshold distance (e.g. at the block 404).

Attention is next directed to FIG. 6 which depicts the car 501 in a backward direction; while signals 503 are not depicted, they are understood to be present. In contrast to FIG. 5, as the car 501 is at a backwards side, only the signal from the a rear object sensor 111-3 (e.g., the third object sensor 111-3) is reflected from the car 501 (e.g. as a reflected signal), which is detected by the rear object sensor 111-3 and data indicating detection thereof is received at the controller 115. In response the controller 115 controls both haptic devices 113-1, 113-2 to vibrate 507 and optionally controls the back haptic device 113-3 to also vibrate 507 (however, in some examples the back haptic device 113-3 vibrates but not the haptic devices 113-1, 113-2). In addition, the controller 115 controls (e.g. at the block 408), the notification device 119 to emit light 607.

As described above, the haptic devices 113 may be provided in any suitable position and/or number. For example, attention is next directed to FIG. 7 which depicts the vehicle 100 adapted to include four haptic devices 113 in the handlebars 101. While not all components of the vehicle 100 are numbered in FIG. 7, they are nonetheless understood to be present.

Figure 7:
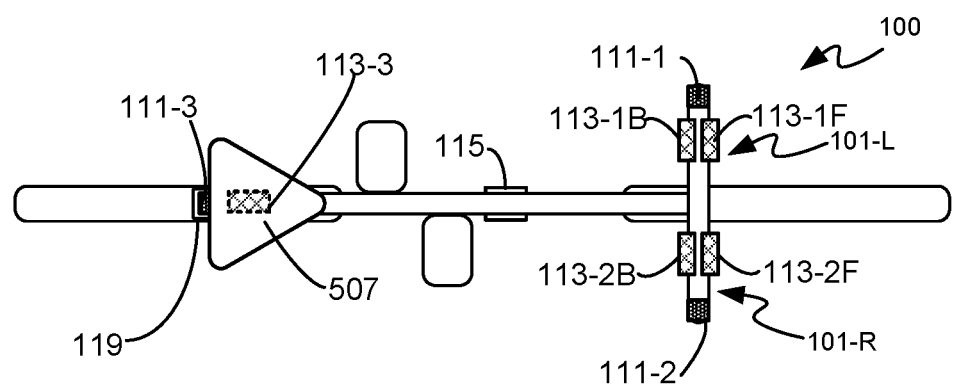
FIG. 7 depicts a top view of another vehicle with a protective warning system, according to alternative non-limiting examples.

In particular, in FIG. 7, the vehicle 100 comprises: a frontward left haptic device 113-1F and a backward left haptic device 113-1B, a frontward right haptic device 113-2F and a backward right haptic device 113-2B. In other words, the left handlebar 101-L includes two haptic devices 113 at a front and back thereof, and the right handlebar 101-R includes two respective haptic devices 113 at a front and back thereof. While the haptic devices 113 are depicted as on the surface of the handlebars 101, is understood that the haptic devices 113 may be located within the handlebars 101 and/or within grips thereof.

Put another way, the frontward left haptic device 113-1F and the frontward right haptic device 113-2F are located at respective frontward sides of the left handlebar 101-L and the right handlebar 101-R; and the backward left haptic device 113-1B and the backward right haptic device 113-2F are located at respective backward sides of the left handlebar 101-L and the right handlebar 101-R.

In this example, the depicted haptic devices 113 may be controlled to indicate a direction of a detected object.

For example, the controller 115 may be configured to: control the frontward left haptic device 113-1F, the backward left haptic device 113-1B, the frontward right haptic device 113-2F and the backward right haptic device 113-2B device to provide an indication according to one or more of a direction of a detected object, and a rate of change in the direction, such that relative vibrations of the frontward left haptic device 113-1F, the backward left haptic device 113-1B, the frontward right haptic device 113-2F and the backward right haptic device 113-2B indicate one or more of the direction and the rate of change in the direction.

Hence, for example, when an object is detected in a leftward direction, the frontward left haptic device 113-1F and the backward left haptic device 113-1B may be controlled to vibrate; and when an object is detected in a rightward direction, the frontward right haptic device 113-2F and the backward right haptic device 113-2B may be controlled to vibrate.

However when an object is detected in a backward direction, the backward left haptic device 113-1B and the backward right haptic device 113-2B may be controlled to vibrate. Similarly, when an object is detected in a frontward direction, the frontward left, the frontward left haptic device 113-1F and the frontward right haptic device 113-2F may be controlled to vibrate.

While a vehicle with a protective warning system has been described heretofore that detects objects using various object sensors and provides notifications via haptic devices, vehicles with other types of protective warning system are within the scope of the present specification.

Figure 8:
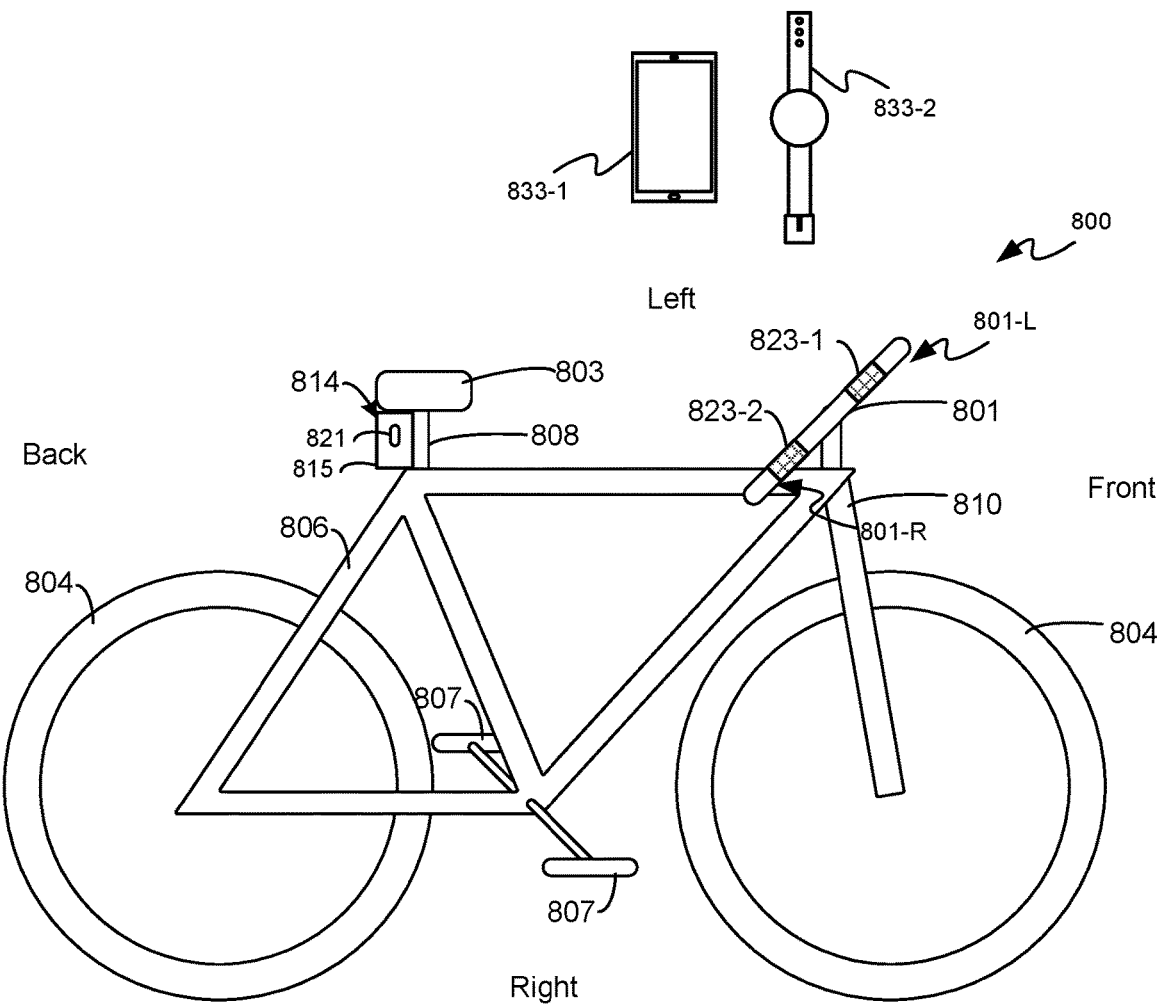
FIG. 8 depicts a side view of a vehicle with a camera based protective warning system (with handlebars depicted in a perspective view), according to non-limiting examples.
Figure 9:
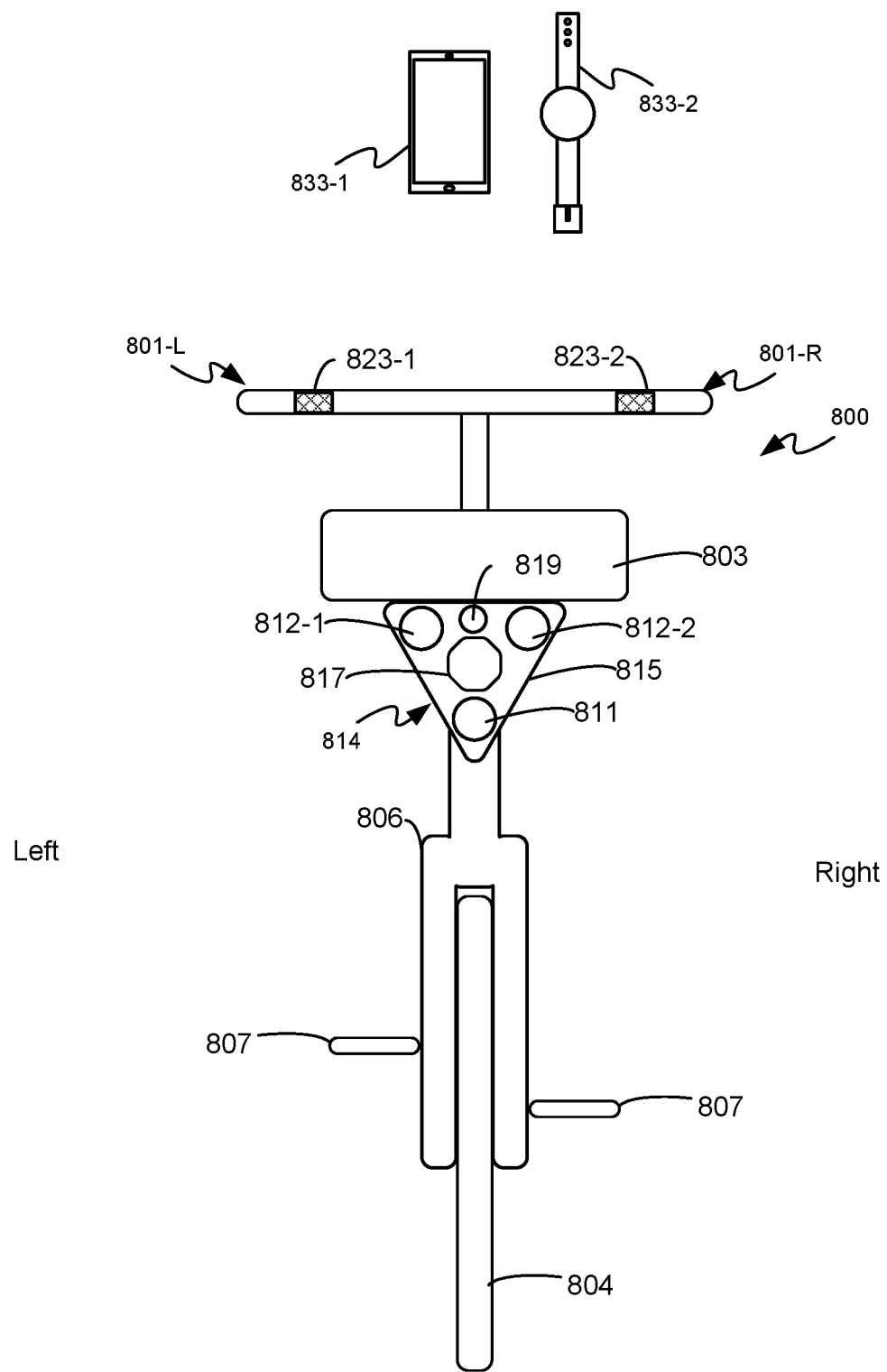
FIG. 9 depicts a rear view of the vehicle of FIG. 8, according to non-limiting examples.

For example, attention is next directed to FIG. 8 and FIG. 9 which schematically depict a side and rear view of a vehicle 800 with a camera-based protective warning system. The vehicle 800 is substantially similar to the vehicle 100 with like components having like numbers, except in an "800" series rather than a "100" series. For example, with reference to FIG. 8 and FIG. 9 the vehicle 800 includes handlebars 801 and a seat 803 for a rider (not depicted) that are substantially similar, respectively, to the handlebars 101 and the seat 103. In FIG. 8, the handlebars 801 are schematically depicted in perspective to show details thereof.

As depicted, the vehicle 800 comprises a bicycle that includes two wheels 804, a frame 806, pedals 807, a seat-post 808, a fork 810, and the like, however the vehicle 800 may comprise any suitable vehicle which includes handlebars and a seat for a rider including, but not limited to, a tricycle, a quadracycle, an all-terrain vehicle (ATV), a motorcycle, an e-bike, an electric vehicle, a snowmobile (e.g. with treads instead of wheels), a farming vehicle, farming machinery, a construction vehicle, construction machinery, and the like, which moves using any suitable combination of wheels, treads, motors, pedals, and the like.

For clarity, in FIG. 8, front, back, left and right directions of the vehicle 800 are indicated; for example, the handlebars 801 are located towards the front at the vehicle 800, and the left and right sides are relative to a rider sitting on the seat 803 facing the front of the vehicle 800. In FIG. 9, left and right directions of the vehicle 800 are indicated.

Furthermore, as depicted, the handlebars 801 comprise a left handlebar 801-L and a right handlebar 801-R, which may be continuous with each other and/or separately attached to the fork 110 of the vehicle 800 which, as depicted, extends from the handlebars 801 to a front wheel 804 of the vehicle 800.

With reference to FIG. 9, the vehicle 800 further includes: a long-range camera 811 positioned to image external objects in a rear-facing direction (e.g. in a direction facing away from the rear of the vehicle 800); and a stereoscopic camera 812 (e.g. which may comprise a two-camera stereoscopic system and/or, as depicted, cameras 812-1, 812-2) positioned to image the external objects in the rear-facing direction, the long-range camera 811 having a focal length longer than a respective focal length of the stereoscopic camera. Hence, the long range-camera 811 is generally configured to image external objects at greater distances than the stereoscopic camera 812; as such, as will be described in more detail below, images from the long range-camera 811 may be used to detect external objects, such as cars, trucks, and the like, as an early warning, and the like, of such external objects that may be approaching the vehicle 800.

While as depicted in FIG. 9 only external components of the cameras 811, 812 (e.g. such as a front surface of respective lenses thereof), it is understood that the cameras 811, 812 may include any suitable camera and/or lens components, including, but not limited to, motors, and the like, for focusing, lenses, apertures, sensors, etc.

Furthermore, the cameras 811, 812 may include one or more of RGB cameras, video cameras, and the like. Furthermore, while references are made throughout the present specification to images acquired by cameras (e.g. including the cameras 811, 812 as well as any cameras of the object sensors 111), such images may include, but are not limited, to video and/or such images may comprise video frames. Furthermore, various analysis and storage of images acquired by cameras hereof is described throughout the present specification, which may include extracting and storing portions of images from images acquired by the cameras 811, 812, and the like; however, where appropriate, such analysis and/or extracting and storage may include analysis and/or extracting and storage of audio of video of the images. In other words, the cameras 811, 812 as well as any cameras of the object sensors 111 may be further configured to acquire audio and hence may include one or more microphones, and the like.

In general, the long-range camera device 811 has a focal length that enables the long-range camera device 811 to image objects, such as vehicles, cars, trucks, vans, bicycles, and the like at distances at which such objects may not pose a danger to the vehicle 800 and/or a rider thereof. In a particular example, the long-range camera device 811 may image objects at distances of up to 60 meters, though any suitable distance is within the scope of the present specification.

The stereoscopic camera 812 is generally configured to image objects stereoscopically, at distances at which such objects may pose a danger to the vehicle 800 and/or a rider thereof, for example at distances of up to 10 meters, and the like, though any suitable distance is within the scope of the present specification. Furthermore, stereoscopic images from the stereoscopic camera 812 may be used to determine distances of objects in the stereoscopic images to the vehicle 800 and/or the stereoscopic camera 812. For example, as the stereoscopic camera 812 comprises a pair of cameras 812-1, 812-2 (e.g. having same or similar focal lengths), which are generally separated by a given distance, pairs of respective images from the cameras 812-1, 812-2 may comprise, together, stereoscopic images and the stereoscopic camera 812, and/or a controller receiving the stereoscopic images from the stereoscopic camera 812, may be calibrated to determine distances of imaged objects from the stereoscopic camera 812, using the given distance, and displacement and/or angles of the imaged objects in the stereoscopic images. As will be explained in more detail below, the stereoscopic images from the stereoscopic camera 812 may be processed to determine whether an object, initially detected in images from the long range camera 811, is within a first zone or a second zone relative to the vehicle 800 and/or the stereoscopic camera 812, and one or more notification devices may be controlled accordingly. For example, the field of view of the stereoscopic camera 812 may be electronically divided into zones and a location of an external object relative to those may be determined using stereoscopic images from the stereoscopic camera 812.

As depicted, the cameras 811, 812-1, 812-2 are arranged in a triangular configuration, however the cameras 811, 812-1, 812-2 may be arranged in any suitable configuration.

As depicted, the cameras 811, 812 are integrated into a device 814 comprising a housing 815 mountable to the vehicle 800, for example, at the seat post 808 and/or under the seat 803, and/or to the frame 806 and/or at any other suitable location on the vehicle 800 where the cameras 811, 812 are positioned to image external objects in the rear-facing direction when the housing 815 is mounted to the vehicle 800. While not depicted, the device 814 and/or the housing 815 may comprise one or more mounting fixtures, and/or be compatible with one or more mounting fixtures, configured to mount the device 814 and/or the housing 815 to the vehicle 800 including, but not limited to, any suitable combination of straps, bolts, nuts, hook and loop devices, and the like. As such, the device 814 may be used to configure the vehicle 800 with the functionality described herein, for example as an after-market product that may be mounted to the vehicle 800 and paired with various notification devices, described in more detail below.

However, in other examples, the cameras 811, 812 may be integrated with the vehicle 800 in a manner that does not include the device 814. For example, the cameras 811, 812 may be integrated with one or more of the seat 803, the frame 806, the seat post 808, and the like, with a respective physical configuration of the seat 803, the frame 806, the seat post 808, and the like adapted accordingly.

With continued reference to FIG. 9, in some examples, the vehicle 800 and/or the device 814 may further comprise, as depicted: a light 817 facing in the rear-facing direction and/or an object sensor device 819. As depicted, the light 817 is in the shape of a stop sign (e.g. an octagon), but the light 817 may be in any suitable shape. The object sensor device 819 may comprise one or more of a radar device, a laser device, a microwave doppler radar motion sensor device (and/or any suitable microwave sensor device and/or doppler radar device), a LiDAR devices and an ultrasonic sensor; in general, the object sensor device 819 may exclude a camera device and, as will be described in more detail below, the object sensor device 819 may be used to assist object detection using the camera devices 811, 812.

While the present specification is described with respect to the cameras 811, 812 positioned to image external objects in the rear-facing direction, as well as the light 817 and the object sensor device 819 being positioned in the rear-facing direction (e.g. as well as the housing 815 of the device 814) it is understood that the cameras 811, 812, the light 817 and the object sensor device 819 may be positioned in any suitable direction (e.g. via mounting the device 814 accordingly). For example, the cameras 811, 812 may be mounted in any suitable manner to image external objects in any suitable direction, with the light 817 and object sensor device 819 similarly facing in such a suitable direction that the cameras 811, 812 are facing. Hence, the term "rear-facing direction" may be replaced with the term "camera-facing direction" throughout the present specification in reference to examples where the cameras 811, 812, light 817, and object sensor device 819, etc., are facing in a direction other than the rear-facing direction.

As depicted, the light 817 is at about a center of a triangle formed by the cameras 811, 812-1, 812-2, and the object sensing device 819 is located between the cameras 812-1, 812-2; however, the light 817 and the object sensing device 819 may be located in any suitable position in the housing 815 and/or at the vehicle 800 (e.g. in or out of the device 814, when present), or integrated with the seat 803, the frame 806, the seat post 808, and/or at any suitable position at the vehicle 800.

While not depicted, the vehicle 800 and/or the device 814 may further comprise one or more speakers, and the like.

In some examples, a face of the housing 815 may, in some examples be provided with one or more reflective films and/or coatings and the like, such that light from headlights of vehicles approaching the vehicle 800 from the rear-facing direction may be reflected back towards the vehicles.

With reference to FIG. 8, in the depicted examples, the device 814 may include a port 821 in a side of the housing 815, and the like, such as a Universal Serial Bus (USB) port and the like, for externally communicating with electrical components of the device 815 via a wireline connection, as described in more detail below with respect to FIG. 10.

However, the port 821 may alternatively be used to charge a battery of the device 814. However, in some examples, the vehicle 800 may comprise an electric vehicle, and the device 814 and/or components thereof, may be powered via a battery of the vehicle 800 (e.g. which may be located at the frame 806), via any suitable wiring scheme.

With further reference to FIG. 8 and FIG. 9, as depicted, the vehicle 800 may optionally further comprise one or more notification devices 823-1, 823-2 (e.g. notification devices 823 and/or a notification device 823), one in each of the left and right handlebars 801. For example as depicted, the notification devices 823 may comprise haptic devices, similar to the haptic devices 113 described herein. While no notification device and/or haptic device is depicted at the seat 803 (e.g. similar to the haptic device 113-3), in other examples, notification device and/or haptic device may be present at the seat 803. However, in the vehicle 800, the notification devices 823 and/or "on-board" notification devices, may be optional.

As also depicted in FIGS. 8 and 9, the vehicle 800 and/or the device 814 may be configured to communicate with one or more external notification devices 833-1, 833-2 (e.g. notification devices 823 and/or a notification device 823) for example via a communication interface of the vehicle 800 and/or the device 814, as described in more detail below. As depicted, the external notification device 833-1 comprises a mobile phone, and the like, and the external notification device 833-2 comprises a smart watch, and the like. One or more of the external notification device 833 may be worn by a rider of the vehicle 800, and the like.

Figure 10:
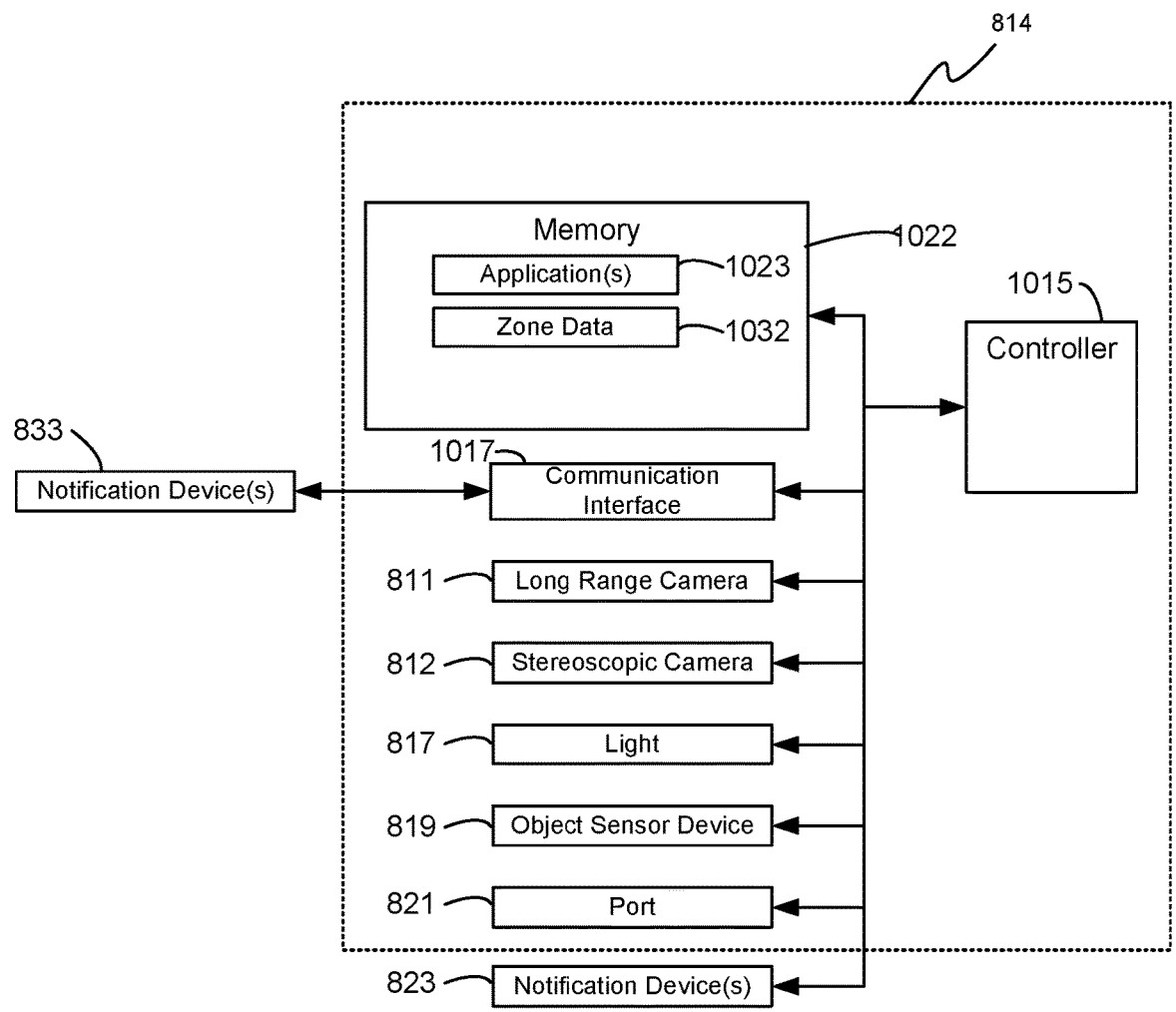
FIG. 10 depicts a block diagram of electronic components of the vehicle of FIG. 8, according to non-limiting examples.

Attention is next directed to FIG. 10 which depicts a block diagram of electronic components of the vehicle 800 and/or the device 814 and which may form a camera-based protective warning system of the vehicle 800. For example, electronic components that may reside in the device 814, when present, are depicted as being within a dashed line.

In particular, FIG. 10 depicts a controller 1015 in communication with the long-range camera 811, the stereoscopic camera 812, and, when present, the light 817 and the object sensor device 819, and/or the port 821, as well as a communication interface 1017 and a memory 1022, for example via a computer bus, and the like. While not depicted, the vehicle 800 and/or the device 814 may further comprise one or more of an accelerometer, a gyroscope and a barometric pressure sensor, which may be used to determine motion of the vehicle 800 and/or which may be used to stabilize images from the cameras 812, 812.

As depicted, the memory 1022 stores an application 1023 and optionally zone data 1032 which may define respective sizes of a first zone and a second zone, relative to the stereoscopic camera 812 and/or the vehicle 800, and the like. For example, the zone data 1032 may comprise data indicating a size of a first zone and a second zone, the second zone being closer to the stereoscopic camera 812 and/or the vehicle 800 than the first zone. For example the zone data 1032 may be simply comprise a respective distances from the stereoscopic camera 812 and/or the vehicle 800, with a first distance representing the first zone being greater than a second distance representing the second zone. However, the zone data 1032 may comprise any suitable data which divides a field-of-view, and the like, of the stereoscopic camera 812 into a first zone and a second zone.

While not depicted, the device 814 may include a battery and/or the device 814 may be powered from a battery of the vehicle 800.

While as depicted the controller 1015, the communication interface 1017 and the memory 1022 may be located at the device 814, the controller 1015, the communication interface 1017 and the memory 1022 may be located and/or distributed at any suitable one or more positions at the vehicle 800 including, but not limited to, within/or under the seat 803, within and/or on the frame 806, and the like. For example, the controller 1015 may be located at the frame 806, similar to the controller 115 being located at the frame 106 of the vehicle 100.

The controller 1015 may comprise a processor and/or a plurality of processors, including but not limited to one or more central processors (CPUs) and/or one or more graphics processing units (GPUs) and/or one or more processing units; either way, the controller 1015 comprises a hardware element and/or a hardware processor. Indeed, in some implementations, the controller 1015 can comprise an ASIC (application-specific integrated circuit) and/or an FPGA (field-programmable gate array) specifically configured for controlling notification devices based on images from a long-range camera and a stereoscopic camera. Hence, the controller 1015 may not be a generic controller, but a device specifically configured to implement specific functionality for controlling notification devices based on images from a long-range camera and a stereoscopic camera. For example, the controller 1015 can specifically comprise a computer executable engine configured to implement functionality for controlling notification devices based on images from a long-range camera and a stereoscopic camera.

The communication interface 1017 comprises any suitable wired or wireless communication interface including, but not limited to, a WiFi™ communication interrace, a Bluetooth™ communication interface, a cell phone communication interface, and the like. As depicted, the communication interface 1017 is in communication with the external notification devices 833 via a communication link (e.g. a wireless communication link depicted as a double ended arrow in FIG. 10); as such, it is understood that the external notification devices 833 may include respective communication interfaces that enable the external notification devices 833 to be paired with the device 814 and/or the vehicle 800 (e.g. via WiFi™ and/or Bluetooth™ pairing, and the like).

While as depicted the notification devices 823 are in communication with the controller 1015 via a computer bus, in other examples the notification devices 823 may be in communication with the controller 1015 via the communication interface 1017, for example when the device 814 is mounted to the vehicle 800 as an after-market product and presuming the notification devices 823 and/or the vehicle 800 includes a respective communication interface that enable the notification devices 823 and/or the vehicle 800 to be paired with the device 814. However, even when the device 814 is mounted to the vehicle 800 as an after-market product, the notification devices 823 may be wired to the device 814, for example via the port 821 and/or any other suitable hardware port (e.g. of the controller 1015).

The memory 1022 may comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the controller 1015 as described herein are typically maintained, persistently, in the memory 1022 and used by the controller 1015 which makes appropriate utilization of volatile storage during the execution of such programming instructions. Those skilled in the art recognize that the memory 1022 is an example of computer readable media that can store programming instructions executable on the controller 1015. Furthermore, the memory 1022 is also an example of a memory unit and/or memory module and/or a non-volatile memory.

In particular, the memory 1022 stores the application 1023 that, when processed by the controller 1015, enables the controller 1015: detect, using images from the long-range camera 811, an external object in a rear-facing direction (e.g. relative to the vehicle 800); in response to detecting the external object, using the images from the long-range camera 811, process stereoscopic images from the stereoscopic camera 812 to determine when the external object is located within a first zone or a second zone extending in the rear-facing direction, the second zone being closer to the stereoscopic camera 812 than the first zone; in response to determining that the external object is located within the first zone, control the one or more notification devices 823, 833 to provide one or more first notifications associated with a first urgency level; in response to determining that the external object is located within the second zone, control the one or more notification devices 823, 833 to provide one or more second notifications associated with a second urgency level greater than the first urgency level.

The application 1023 may include numerical algorithms, and/or programmed algorithms, predetermined algorithms, and/or static algorithms configured to control a protective warning system of a vehicle.

Alternatively, and/or in addition to numerical algorithms, and/or programmed algorithms, predetermined algorithms, and/or static algorithms, the application 1023 may include machine learning models and/or algorithms, and the like, which have been trained to control a protective warning system of a vehicle. Furthermore, in these examples, the application 1023 may initially be operated by the controller 1015 in a training mode to train the machine learning models and/or algorithms of the application 1023 to perform the above described functionality and/or generate classifiers therefor. Furthermore, in some examples, a rider of the vehicle 800 may later review images from the cameras 811, 812 to classify such images and/or portions of such images, which may be added to a machine learning training queue to better train the machine learning models and/or refine classifiers therefor. Indeed, such a process may be used for any machine learning functionality described herein.

The one or more machine learning models and/or algorithms of the application 1023 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like.

However, as data stored by the controller 1015 may later be used in court proceedings, generalized linear regression algorithms, random forest algorithms, support vector machine algorithms, gradient boosting regression algorithms, decision tree algorithms, generalized additive models, and the like may be preferred in present examples over neural network algorithms, deep learning algorithms, evolutionary programming algorithms, and the like. In particular, generalized linear regression algorithms, random forest algorithms, support vector machine algorithms, gradient boosting regression algorithms, decision tree algorithms, generalized additive models, and the like may be preferred in some public safety environments, such as courts. Regardless, any suitable machine learning algorithm and/or deep learning algorithm and/or neural network is within the scope of present examples.

Figure 11:
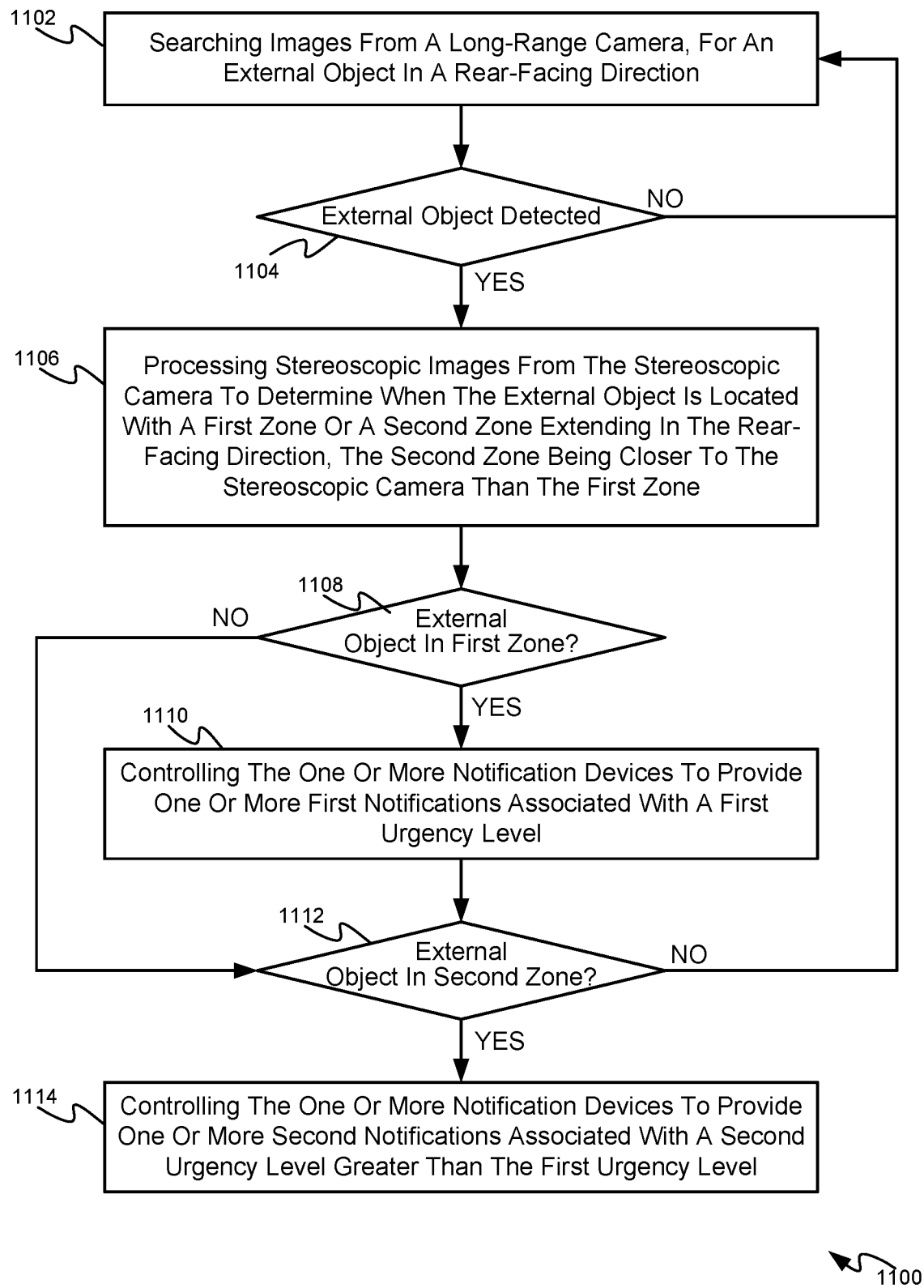
FIG. 11 depicts a flowchart of a method for controlling a camera-based protective warning system of the vehicle of FIG. 8, according to non-limiting examples.

Attention is now directed to FIG. 11 which depicts a flowchart representative of a method 1100 for controlling a camera-based protective warning system of a vehicle. The operations of the method 1100 of FIG. 11 correspond to machine readable instructions that are executed by the controller 1015. In the illustrated example, the instructions represented by the blocks of FIG. 11 are stored at the memory 1022 for example, as the application 1023. The method 1100 of FIG. 11 is one way in which the controller 1015 and/or the vehicle 800 and/or the device 814 may be configured. Furthermore, the following discussion of the method 1100 of FIG. 11 will lead to a further understanding of the vehicle 800 and/or the device 814, and their various components.

The method 1100 of FIG. 11 need not be performed in the exact sequence as shown and likewise various blocks may be performed in parallel rather than in sequence. Accordingly, the elements of method 1100 are referred to herein as "blocks" rather than "steps." The method 1100 of FIG. 11 may be implemented on variations of the vehicle 800 and/or the device 814, as well.

At a block 1102, the controller 1015 searches images from the long-range camera 811 for an external object in a rear-facing direction (e.g. relative to the device 814, as mounted to the vehicle 800 and/or the vehicle 800). As used herein, the term "external object" is used to refer to an object external to the vehicle, such as other vehicles and the like. For example, the controller 1015 may be configured to search for different object types in the images using machine learning classifiers and machine learning algorithms, and/or the controller 1015 may be configured to search for different object types using bounding box-based image processing techniques and the like. In particular, the controller 1015 may be configured to search for external objects including, but not limited to, cars, trucks (e.g. which may include trucks of different types, such as pickup trucks, 18 wheelers, etc.), vans (e.g. which may include vans of different types, such as family vans, delivery vans, etc.), SUVs (sports utility vehicles), motorcycles, bicycles, and the like. However, the external objects may include other types of non-vehicle external objects including, but not limited to, animals, boulders (e.g. from falling rock), and/or any other type of suitable external objects. For example different machine learning classifiers may be used which represent the various external object types.

At a block 1104, the controller 1015 determines whether an object is detected in the images from the long-range camera 811; for example, the controller 1015 may detect one of the external objects represented by a machine learning classifier and/or as represented by data for searching for objects in images using bounding box-based image processing techniques and the like.

Furthermore, in some examples, a location of the object in the images may be determined by the controller 815 (e.g. a position of the object in pixels of the images, relative to a given edge of the images, and the like), which may represent a location of the object relative to the field-of-view of the long-range camera 811 and/or a direction of the object relative to the vehicle 800, and the like.

Furthermore, in other examples, the type of the object may be determined, as described above.

When no object is detected (e.g. a "NO" decision at the block 1104), the controller 1015 may repeat the block 1102.

Put another way, the blocks 1102, 1104 may be performed in tandem until an object is detected.

In response to detecting an external object using the images from the long-range camera 811 (e.g. a "YES" decision at the block 1104), at a block 1106, the controller 1015 processes stereoscopic images from the stereoscopic camera 812 to determine when the external object is located within a first zone or a second zone extending in the rear-facing direction, the second zone being closer to the stereoscopic camera than the first zone.

For example, when the controller 115 determines the location of the object relative to the field-of-view of the long-range camera 811 and/or a direction of the object relative to the vehicle 800, the controller 1015 may search for the object in a corresponding field of view of the stereoscopic camera 812 and/or in a similar direction.

Alternatively, and/or in addition, the controller 1015 may search for a determined type of the external object in the stereoscopic images from the stereoscopic camera 812.

Alternatively, and/or in addition, the controller 1015 may compare the imaged external object in the images from the long-range camera 811 with imaged external objects in the stereoscopic images and look for a match (e.g. including, but not limited to, a partial match) therebetween.

Regardless, the images from the long-range camera 811 may be used to initially search for external object at distances that are within a range and/or focal length of the long-range camera 811, and then search for the same external objects in the stereoscopic images from the stereoscopic camera 812, for example as the external objects come closer to the vehicle 800 (e.g. as the stereoscopic camera 812 has a shorter focal length than the long-range camera 811 and cannot "see" as far as the long-range camera 811).

Furthermore, the field-of-view and/or distances from the short-range camera 812 may be divided into zones, which may be represented by the zone data 1032, as described above.

At the block 1108, the controller 1015 determines whether the external object is in the first zone. For example, the controller 1015 may determine a distance of the external object from the stereoscopic camera 812 (e.g. using the stereoscopic images) and determine whether the external object is in the first zone (e.g. within a first distance from the stereoscopic camera 812 that represents the first zone, but outside a second distance from the stereoscopic camera 812 that represents the second zone, and/or within the boundaries of the first zone). In some examples the first zone may be in a range of 3 to 10 meters from the stereoscopic camera 812, and the second zone may be in a range of 2 to 3 meters from the stereoscopic camera 812. However, a size of the first zone and the second zone may be configurable (e.g. via a suitable application and/or "app", for example at the mobile device 833-1 and/or the smart watch 833-2, and the like) and/or a cloud device, and the like.

Furthermore, in some examples, the method 1100 may further comprise the controller 1015 determining, using the images from the long-range camera 811, a type of the external object, as described above, and the stereoscopic images from the stereoscopic camera may be processed, or not processed, to determine when the external object is located with the first zone or the second zone, depending on the type of the external object. For example, images of some types of objects, such as bicycles, and the like, may be ignored, while images of other types of objects, such as cars, may be processed to determine when the external object is located with the first zone or the second zone. In some of these examples, whether an image of an object of a given type is processed or not processed may be configurable via a suitable application and/or "app" and/or cloud device.

Furthermore in some examples, the method 1100 may further comprise the controller 1015 determining, using the images from the long-range camera 811, a type of the external object; and controlling a respective size of one or more of the first zone and the second zone, depending on the type of the external object. For example, the first zone and/or the second zone may be increased for 18 wheelers and/or decreased for cars and/or motorcycles, and the like. Hence, in some examples, a size of the first zone and/or the second zone may be dynamic based on a type of a detected external object.

Similarly, in some examples, the method 1100 may further comprise the controller 1015 determining, using the images from the long-range camera 811 and/or stereoscopic images from the stereoscopic camera 812, one or more of: a velocity of the external object; an acceleration of the external object; and an estimated time of impact of the external object with the vehicle 800; and controlling a respective size of one or more of the first zone and the second zone, depending on one or more of: the velocity of the external object; the acceleration of the external object; the trajectory of the external object, and the estimated time of impact of the external object with the vehicle 800. For example, as the velocity and/or the acceleration increases, and/or as the estimated time of impact decreases, the size of the first zone and the second zone may be increased, and vice versa.

In n response to determining that the external object is located with the first zone (e.g. a "YES" decision" at the block 1108), the controller 1015 controls the one or more notification devices 823, 833 to provide one or more first notifications associated with a first urgency level and/or first classification. Such controlling may occur via the communication interface 1017.

For example, at the block 1110, the haptic devices of the notification devices 823 may be controlled to vibrate at a first predetermined frequency and/or intensity, and/or the mobile device and/or the smart watch of the notification devices 833 may be controlled to one or more of: provide first predetermined respective haptic notifications at respective first predetermined frequencies and/or intensities; emit first predetermined aural notifications via respective speakers (e.g. "A VEHICLE IS APPROACHING FROM BEHIND"); emit first predetermined visual notifications via respective lights and/or display screens (e.g. one or more lights may blink with predetermined colors and/or frequencies and/or intensities, and/or respective display screens may provide respective text (e.g. "A VEHICLE IS APPROACHING FROM BEHIND") and/or graphics), and the like.

At the block 1112, which may be performed in parallel with one or more of the blocks 1108, 1110, the controller 1105 determines whether the external object is located with the second zone, in a manner similar to the controller 1015 determining whether the external object is located with the first zone. The block 1112 may further be implemented, as depicted, in response to the controller 1015 determining, at the block 1108, that the external object is not in the first zone (e.g. a "NO" decision at the block 1108).

When the controller 1105 determines that the external object is not located with the second zone (e.g. a "NO" decision at the block 1112), the controller 1105 may repeat the method 1100 from the block 1102 to search for other external objects; however, the controller 1105 may repeatedly implement the block 1106 and/or the block 1108 and/or the block 1112 to continue to search the stereoscopic images from the stereoscopic camera 812 for the external object, for example for a given time period (e.g. which may also be dynamic based on the type of the external object, and the like); the controller 1015 may stop searching the stereoscopic images from the stereoscopic camera 812 for the external object, after the given time period.

However, in response to determining that the external object is located with the second zone (e.g. a "YES" decision at the block 1112), at the block 1114, the controller 1015 controls the one or more notification devices 823, 833 to provide one or more second notifications associated with a second urgency level greater than the first urgency level. Such controlling may occur via the communication interface 1017 (e.g. when at least one notification device 833, of the one or more notification devices 823, 833, is external to the vehicle 800, the controller 1015 may control the at least one notification device to provide at least one of the one or more first notifications and the one or more second notifications via the communication interface 1017).

For example, at the block 1112, the haptic devices of the notification devices 823 may be controlled to vibrate at a second predetermined frequency and/or intensity, and/or the mobile device and/or the smart watch of the notification devices 833 may be controlled to one or more of: provide second predetermined respective haptic notifications at respective second predetermined frequencies and/or intensities; emit second predetermined aural notifications via respective speakers (e.g. "A VEHICLE IS ABOUT TO HIT YOU FROM BEHIND"); emit second predetermined visual notifications via respective lights and/or display screens (e.g. one or more lights may blink with predetermined colors and/or frequencies and/or intensities, and/or respective display screens may provide respective text, such as "A VEHICLE IS ABOUT TO HIT YOU FROM BEHIND", and/or graphics), and the like.

In general, the notifications provided at the block 1114, may be more intense, and/or louder and/or more frequent and/or brighter, and the like, than the notifications provided at the block 1110. For example, the notifications provided at the block 1114 may be associated with a second urgency level and/or second classification that is greater than a first urgency level and/or first classification of the notifications provided at the block 1110 and hence the notifications provided at the block 1114 may be configured to more urgently gain the attention of the rider of the vehicle, as compared to the notifications provided at the block 1110, as the detected external object is understood to be closer to the vehicle 800 in the second zone than in the first zone.

However, the notifications of the blocks 1110, 1114 may be configurable via an application and/or "app" and/or cloud device, as described above.

In some examples, where the vehicle 800 and/or the device 814 comprises the light 817, the method 1100 may further comprise the controller 1015, in response to determining that the external object is located with the second zone (e.g. a "YES" decision at the block 1112), controlling the light 817 to flash to provide a notification to a driver of the external object (e.g. an external vehicle), and the like for example to slow down and/or stop and/or as general indication of the presence of the vehicle 800. For example, as the light 817 is in the shape of a stop sign, the driver of the external object/vehicle may further understand the notification provided by the light 817 as a command to stop. In examples where the vehicle 800 and/or the device 814 comprises a speaker, the speaker may be controlled to provide an aural notification to a driver of the external object (e.g. an external vehicle), and the like for example to slow down and/or stop and/or as general indication of the presence of the vehicle 800 (e.g. an aural command to "STOP", and the like).

In other examples, the method 1100 may further comprise the controller 1015, in response to determining that the external object is located with the second zone (e.g. a "YES" decision at the block 1112), one or more of: store the stereoscopic images from the stereoscopic camera 812 at a memory (e.g. the memory 1022 and/or by transmitting the stereoscopic images to one or more of the mobile device and/or the smart watch of the notification devices 833 for storage at a respective memory); and extracting a given information of the external object (e.g. an external vehicle) from the stereoscopic images and storing the given information at the memory, the given information comprising one or more of, when the external object comprises a respective vehicle: a license plate number of the respective vehicle; details of the respective vehicle; and respective images of one or more a driver of the respective vehicle and passengers of the respective vehicle. For example, machine learning algorithms of the application 1023 may be trained to recognize such given information and the memory 1022 may store respective machine learning classifiers thereof. In examples where the vehicle 800 and/or the device 814 comprises one or more of an accelerometer, a gyroscope and a barometric pressure sensor, data therefrom may also be stored at a memory in response to determining that the external object is located with the second zone. Hence, "black box" type information may be stored for later use in understanding any collision, and the like, that may occur between the vehicle 800 and the external object.

In other examples, the method 1100 may further comprise the controller 1015: determining, using the stereoscopic images from the stereoscopic camera 812, one or more of: a velocity of the external object; an acceleration of the external object; a trajectory of the external object, and an estimated time of impact of the external object with the vehicle; and controlling the one or more notification devices 823, 833 to provide at least one of the one or more first notifications and the one or more second notifications as a function of one or more of: the velocity, the acceleration, trajectory and the estimated time of impact. For example, the notifications provided at one or more of the block 1110 and the block 1114 may be modified based on the velocity, the acceleration, trajectory and the estimated time of impact; for example, a value of the velocity, the acceleration, and/or a direction of approach, and the like, of the external object (e.g. as determined from the trajectory) may be included in an aural and/or visual notification. However, lights and/or sounds and/or vibrations provided at one or more of the block 1110 and the block 1114 may depend on the velocity, the acceleration, trajectory and the estimated time of impact.

In some examples, the object sensor device 819, when present may be used to assist the controller 1015 with implementing various aspects of the method 1100. For example, the method 1100 may further comprise the controller 1015 controlling the one or more notification devices 823, 833 to provide at least one of the one or more of the first notifications (e.g. at the block 1110) and the one or more second notifications (e.g. at the block 1114) based on sensed data from the object sensor device 819. For example a velocity and/or acceleration of an external object may be sensed using the object sensor device 819 (similar to as described above with respect to the method 400 and/or the vehicle 100; e.g. sensed data of the object sensor device 819 may indicate velocity and/or acceleration of an external object) and the notifications provided by the one or more notification devices 823, 833 may be adjusted accordingly.

Indeed, the method 1110 may further comprise the controller 1015 one or more of: using sensed data from the object sensor device 819 to detect an external object, for example to assist with external object detection by the camera 811, 812; using the sensed data from the object sensor device 819 to detect the external object in place of detecting the external object using the images from the long-range camera 811 (e.g. when a lens of the long-range camera 811 is dirty and/or when ambient is light is too dark to detect objects in images from the long-range camera 811, the like); using the sensed data from the object sensor device 819 to detect whether the external object is in the first zone or the second zone in place of relying on the stereoscopic images (e.g. when lenses of the stereoscopic camera 812 is dirty and/or when ambient is light is too dark to detect objects in stereoscopic images form the stereoscopic camera 812, the like). Hence, in some of these examples, the object sensor device 819 may be used to detect objects in place of one or more of the cameras 811, 812 (e.g. as a backup sensor for one or more of the cameras 811, 812), and/or to confirm presence of external objects, and/or a distance thereof, as determined using images from one or more of the cameras 811, 812.

As described above, in some examples, the vehicle 800 and/or the device 814 may comprise one or more of an accelerometer, a gyroscope and a barometric pressure sensor, and the controller 1015 further configured to use data from one or more of the accelerometer, the gyroscope and the barometric pressure sensor to assist with stabilizing one or more of the images and the stereoscopic images, for example to assist with detecting external objects in the images and the stereoscopic images.

In yet further examples, the controller 1015 is further configured to control the one or more notification devices 823, 833 to provide the one or more first notifications (e.g. of the block 1110) and the one or more second notifications (e.g. of the block 1114) in a training mode. For example, a rider of the vehicle 800 may interact with the one or more notification devices 823, 833 to feel, hear, see, and the like, notifications of the notification devices 823, 833 along with an indication (e.g. text and/or graphics and/or sound) of a notification being a first notification or a second notification, for example to accustom and/or train the rider to understand meaning of a first notification and/or a second notification.

In some examples, the communication interface 1017 may be used to communicate with a second vehicle (and/or second vehicles) and/or second device (and/or second devices) which are similar to, and/or the same as, the vehicle 800 and/or the device 814, and proximal thereto, for example to form one or more of a local network and a machine learning network with the second vehicle and/or the second device to assist each other in external object detection. For example, one or more of the vehicle 800 (and/or the device 814), and/or a second vehicle (and/or second device) may detect an external object and communicate information regarding detection of the external object to the other vehicle and/or other device, such as location, velocity, acceleration, and the like. In some of these examples, one or more of the vehicle 800 (and/or the device 814), and/or a second vehicle (and/or second device) may detect a location and/or trajectory of an external object relative to the other of the other vehicle and/or other device and, when the external object is on a path to collide with the other vehicle and/or other device, the information exchanged with the other vehicle may indicate such a collision. When the path of the external object does not collide with the other vehicle, in some examples, no information may be exchanged.

Hence, in some examples, the method 1100 may further comprise the controller 1015, one or more of: via the communication interface 1017: transmitting, to a second vehicle, information regarding external objects; receiving, from the second vehicle, respective information regarding external objects; and forming one or more of a local network and a machine learning network with the second vehicle to assist each other in external object detection.

Figure 12:
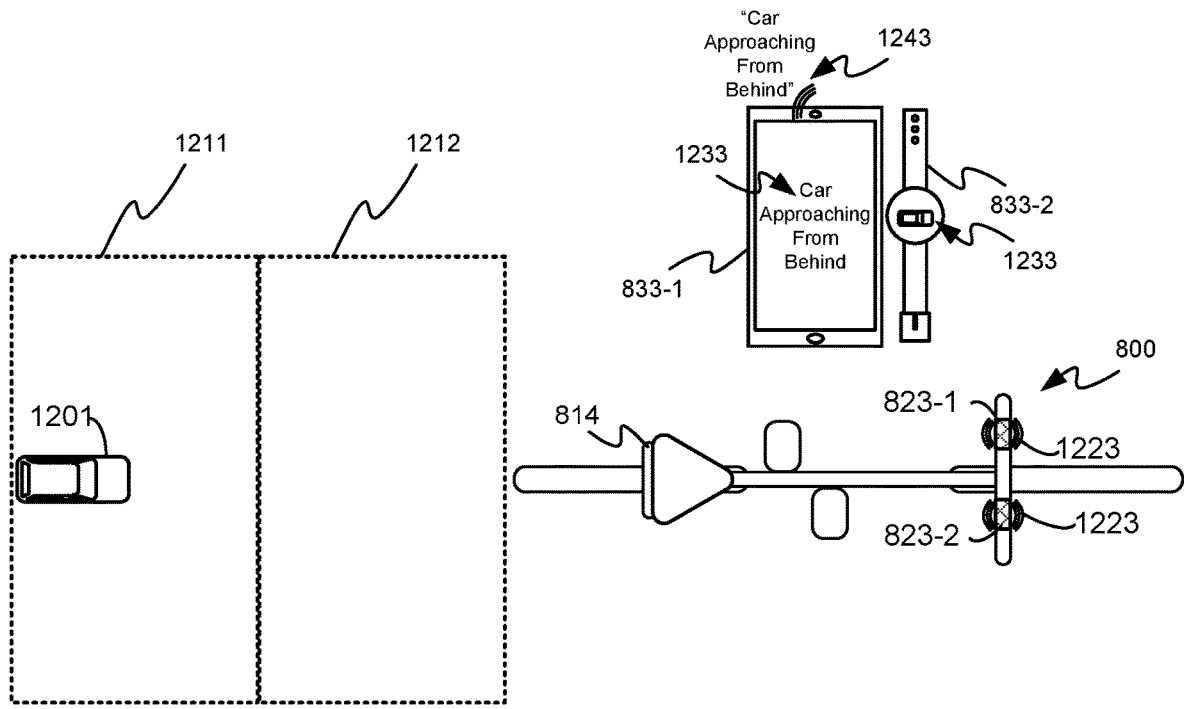
FIG. 12 depicts an example of the camera-based protective warning system in operation.
Figure 13:
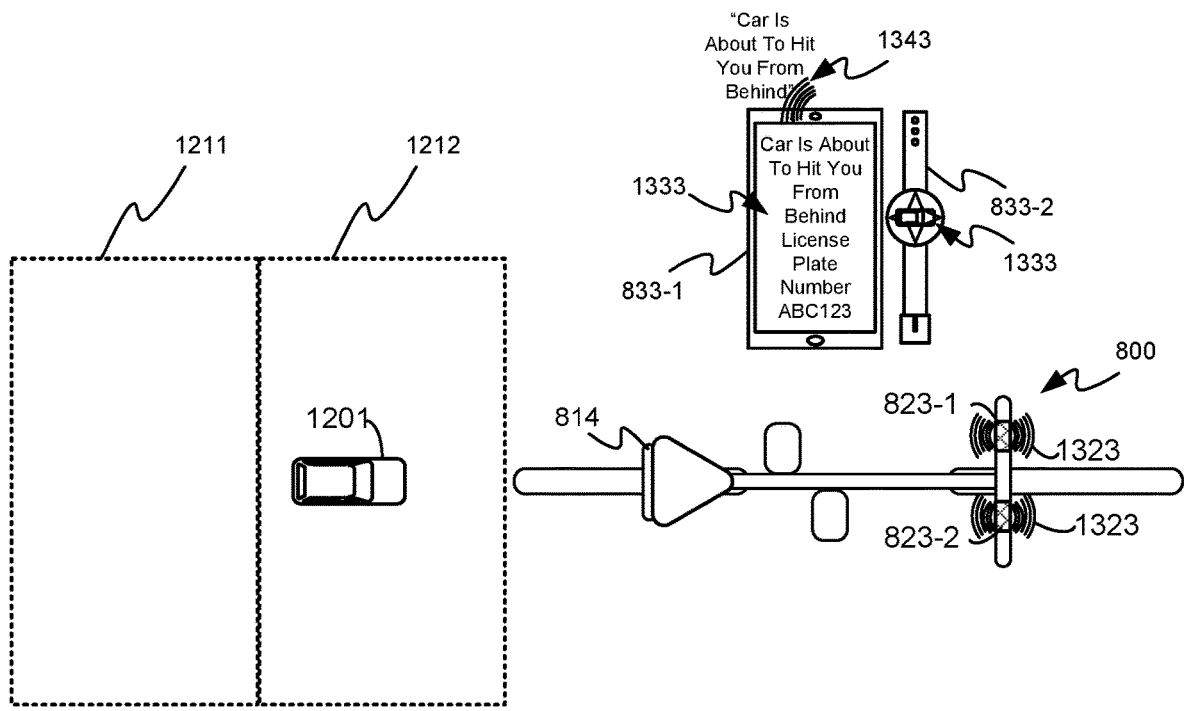
FIG. 13 depicts another example of the camera-based protective warning system in operation.
Figure 14:
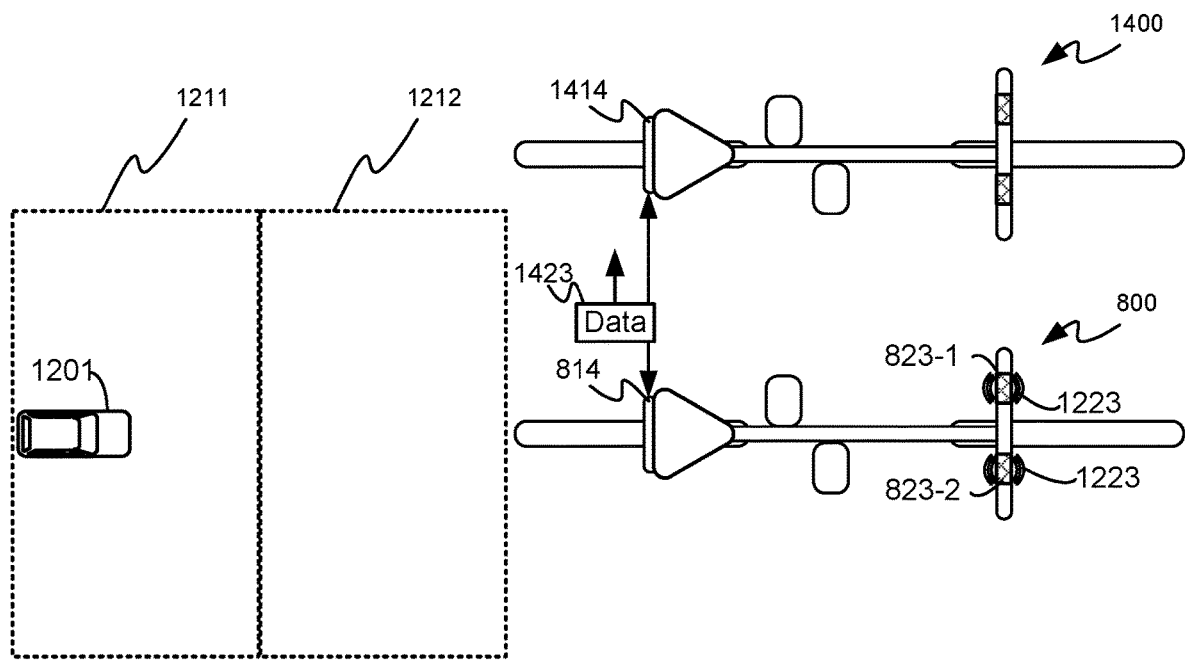
FIG. 14 depicts two vehicles with camera-based protective warning systems forming a local network and/or a machine learning network, according to alternative non-limiting examples

Attention is next directed to FIG. 12, FIG. 13 and FIG. 14 which show examples of the method 1100 with the vehicle 800. In particular, FIG. 12, FIG. 13 and FIG. 14 show a top view of the vehicle 800, along with the notification devices 833 (e.g. not to scale). Furthermore, while not all components of the vehicle 800 are numbered, they are nonetheless understood to be present.

Furthermore, in FIG. 12 and FIG. 13 a car 1201 (e.g. an external object) is approaching the vehicle 800 from a rear-facing direction. In FIG. 12 the car 1201 is located in a first zone 1211 (e.g. as defined by the zone data 1032), while in FIG. 13 the car 1201 is located in a second zone 1212 (e.g. as defined by the zone data 1032).

Hence, in FIG. 12, it is understood that the controller 1015 has detected the car 1201 in images from the long-range camera 811, and further determined that the car 1201 is located in the first zone 1211 using stereoscopic images from the stereoscopic camera 812. Hence, as depicted, the controller 1015 controls (e.g. at the block 1110 of the method 1100) the notification devices 823 to vibrate to provide first haptic notifications 1223 (e.g. vibrations) and furthermore, the controller 1015 controls (e.g. at the block 1110 of the method 1100) the notification devices 833 (e.g. via a communication link therewith via the communication interface 1017) to provide respective first visual notifications 1233 (e.g., text, indicative of a car approaching, at a display screen of the mobile device of the notification device 833-1 and an icon, indicative of a car approaching, at a display screen of the smart watch of the notification device 833-2), and a first aural notification 1243 from a speaker of the mobile device of the notification device 833-1. While not depicted, the smart watch of the notification device 833-2 may also be controlled to emit an aural notification and/or one or more of the notification devices 833 may be controlled to provide a haptic notification.

In contrast, in FIG. 13, it is understood that the controller 1015 has detected that the car 1201 is located in the second zone 1212 using stereoscopic images from the stereoscopic camera 812. Hence, as depicted, the controller 1015 controls (e.g. at the block 1114 of the method 1104) the notification devices 823 to vibrate to provide second haptic notifications 1323 (e.g. vibrations) which may be more intense and/or faster than the first haptic notifications 1223. Similarly, the controller 1015 controls (e.g. at the block 1110 of the method 1100) the notification devices 833 (e.g. via a communication link therewith via the communication interface 1017) to provide respective second visual notifications 1333 (e.g., text, indicative of a car crash, at a display screen of the mobile device of the notification device 833-1, and an icon, indicative of a car crash, at a display screen of the smart watch of the notification device 833-2), and a second aural notification 1343 from a speaker of the mobile device of the notification device 833-1. The second aural notification 1343 may be louder than the first aural notification 1243. While not depicted, the smart watch of the notification device 833-2 may also be controlled to emit a louder aural notification and/or one or more of the notification devices 833 may be controlled to provide a more intense haptic notifications. As depicted, the text at the display screen of the mobile device of the notification device 833-1 also includes a license plate number of the car 1201 indicating that the license plate number has been extracted from the stereoscopic images from the stereoscopic camera 812 and, for example, stored at a memory. However, as described above, one or more of a make, model and images of a driver and/or passengers of the car 1201 may also be stored.

Attention is next directed to FIG. 14 which depicts the vehicle 800 and/or the device 814 and/or the controller 1015 communicating with a second vehicle 1400 and/or second device 1414 and/or second controller (e.g. not depicted but which may be located at the second vehicle 1400 and/or second device 1414), the second vehicle 1400 and/or second device 1414 and/or the second controller respectively similar to the vehicle 800 and the device 814 and/or the controller 1015. As depicted, the controller 800 and/or the device 814 has detected the car 1201 and is communicating data 1423 indicative of detecting the car 1201 to the second vehicle 1400 and/or second device 1414 and/or the second controller to assist the second vehicle 1400 and/or second device 1414 and/or the second controller with object detection. For example the data 1423 may indicate a location and/or direction and/or speed and/or acceleration and/or trajectory of the car 1201. Alternatively, the data 1423 may comprise a machine classifier of the car 1201 to "teach" the vehicle 1400 and/or the device 1414 to identify the car 1201. While not depicted, the second vehicle 1400 and/or second device 1414 and/or the second controller may transmit similar data to vehicle 800 and/or the device 814 and/or the controller 1015 indicative of objects detected by the second vehicle 1400 and/or second device 1414 and/or the second controller. Hence, the vehicles 800, 1400 and/or devices 814, 1414 and/or the controller 1015 (and the controller of the vehicle 1400) may form a local network and/or machine learning network. In particular, data exchanged therebetween may be used to refine machine learning classifiers stored at the vehicles 800, 1400 and/or the devices 814, 1414, for example for detecting external objects and/or determining types of external objects and the like. Furthermore, data exchanged therebetween may be used to alert the vehicles 800, 1400 and/or devices 814, 1414 of external objects detected by the other vehicle and/or device.

While the vehicle 800 and the device 814 have been described with respect to dividing the field-of-view of the stereoscopic camera 812 into two zones (e.g. the first zone 1211 and the second zone 1212), in other examples, the field-of-view of the cameras 811, 812 may be divided into three zones: for example, a first zone which includes a maximum distance up to which the long-range camera 811 is configured to image, a second zone, corresponding to the first zone 1211, and the like, as described herein, and a third zone, corresponding to the second zone 1212, and the like, as described herein. In these examples, the first zone may be from the maximum distance up to which the long-range camera 811 is configured to image, to the respective maximum distance of the second zone (e.g. the first zone 1211, and the like, as described herein). Hence, for example, as the fields-of-view of the cameras 811, 812 may overlap, use of three zones may allow the controller 1015 to divide the combined fields-of-view of the cameras 811, 812 into the three zones and control the notifications devices 823, 833 accordingly. For example, in these examples, the controller 1022 of the vehicle 800 and/or the device 814 may be configured to: detect, using images from the long-range camera, an external object in a first zone in the rear-facing direction; in response to detecting the external object, using the images from the long-range camera, process stereoscopic images from the stereoscopic camera to determine when the external object is located within a second zone or a third zone extending in the rear-facing direction, the first zone being closer to the stereoscopic camera than the second zone, and the second zone being closer to the stereoscopic camera than the third zone; in response to determining that the external object is located within the second zone, control the one or more notification devices to provide one or more first notifications associated with a first urgency level; in response to determining that the external object is located within the third zone, control the one or more notification devices to provide one or more second notifications associated with a second urgency level greater than the first urgency level.

Yet further features are within the scope of the present specification. For example, while notifications 1233, 1333 at the notification devices 833-1, 833-2 have been described with respect to two textual and/or two graphic notifications, such notifications may be in any suitable format and/or be in any suitable number. For example, such notifications may be color coded based on location and/or direction and/or speed and/or acceleration and/or trajectory of a detected external object, such as the car 1201; for example, different colored notifications can be provided at the notification devices 833-1, 833-2 depending on whether an external object is in the zone 1211 or the zone 1212 and/or a speed and/or acceleration and/or trajectory of a detected external object. In a particular example, four colors may be used for notifications, such as white, green, yellow and red, with white indicating that no external objects have been detected, green indicating that an external object has been detected but a location and/or direction and/or speed and/or acceleration and/or trajectory of the external object is not causing danger to the vehicle 800, yellow indicating that the external object is in the first zone 1211 (e.g. similar to the notification 1233), and red indicating that the external object is in the second zone 1212 (e.g. similar to the notification 1333). However, any suitable criteria may be used to provide a plurality of different levels of notifications at the notification devices 833-1, 833-2 in any suitable format.

In yet further examples, video from one or more of the cameras 811, 812 may be provided at, and/or live-streamed to, one or more of the notification devices 833-1, 833-2, such that one or more of the notification devices 833-1, 833-2 may function as a rear-view "mirror" for the vehicle 800. In particular, the mobile device 833-1 may be mounted to the handlebars 801; as such, a rider of the vehicle 800 may conveniently glance at the mobile device 833-1 to view a rear of the vehicle 800 (e.g. as well as see notifications referred to above).

Indeed, in some of these examples, such video from one or more of the cameras 811, 812 may further be stored at a memory, such as a memory of one or more of the notification devices 833-1, 833-2. Alternatively, and/or in addition, video from one or more of the cameras 811, 812 may be provided to, and/or streamed to, a memory device in the "cloud" and stored. Regardless, such storage of video from one or more of the cameras 811, 812 may provide a record of travels of the vehicle 800 and/or external objects that approached the vehicle 800; such storage of video may be useful when the vehicle 800 and external objects engage in an accident, with the video acting as a record of the accident.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

As should be apparent from this detailed description above, the operations and functions of computing devices, and the like, described herein are sufficiently complex as to require their implementation on a computer system, and cannot be performed, as a practical matter, in the human mind. Computing devices, and the like, such as set forth herein are understood as requiring and providing speed and accuracy and complexity management that are not obtainable by human mental steps, in addition to the inherently digital nature of such operations (e.g., a human mind cannot interface directly with a Random Access Memory, or other digital storage, cannot transmit or receive electronic messages and/or information, electronically encoded video, electronically encoded audio, etc., among other features and functions set forth herein).

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A vehicle comprising:
   handlebars;
   a seat for a rider;
   a long-range camera positioned to image external objects in a rear-facing direction;
   a stereoscopic camera positioned to image the external objects in the rear-facing direction, the long-range camera having a focal length longer than a respective focal length of the stereoscopic camera; and
   a controller in communication with the long-range camera and the stereoscopic camera, the controller in further communication with one or more notification devices, the controller configured to:
   detect, using images from the long-range camera, an external object in the rear-facing direction;
   in response to detecting the external object, using the images from the long-range camera, process stereoscopic images from the stereoscopic camera to determine when the external object is located within a first zone or a second zone extending in the rear-facing direction, the second zone being closer to the stereoscopic camera than the first zone;
   in response to determining that the external object is located within the first zone, control the one or more notification devices to provide one or more first notifications associated with a first urgency level;
   in response to determining that the external object is located within the second zone, control the one or more notification devices to provide one or more second notifications associated with a second urgency level greater than the first urgency level,
   wherein the controller is further configured to one or more of:
   determine, using the images from the long-range camera, a type of the external object, wherein the stereoscopic images from the stereoscopic camera are processed, or not processed, to determine when the external object is located within the first zone or the second zone, depending on the type of the external object; and
   determine, using the images from the long-range camera, the type of the external object; and control a respective size of one or more of the first zone and the second zone, depending on the type of the external object.

2. The vehicle of claim 1, wherein the stereoscopic camera comprises a two-camera stereoscopic system.

3. The vehicle of claim 1, further comprising a light facing in the rear-facing direction, wherein the controller is further configured to:
   in response to determining that the external object is located within the second zone, control the light to flash to provide a notification to a driver of the external object.

4. The vehicle of claim 1, wherein the controller is further configured to, in response to determining that the external object is located within the second zone, one or more of:
   store the stereoscopic images at a memory; and
   extract given information from the stereoscopic images and store the given information at the memory, the given information comprising one or more of, when the external object comprises a respective vehicle: a license plate number of the respective vehicle; details of the respective vehicle; and respective images of one or more a driver of the respective vehicle and passengers of the respective vehicle.

5. The vehicle of claim 1, wherein the controller is further configured to:
determine, using the stereoscopic images from the stereoscopic camera, one or more of: a velocity of the external object; an acceleration of the external object; a trajectory of the external object, and an estimated time of impact of the external object with the vehicle; and
control the one or more notification devices to provide at least one of the one or more first notifications and the one or more second notifications as a function of one or more of: the velocity, the acceleration, trajectory and the estimated time of impact.

6. The vehicle of claim 1, further comprising an object sensor device comprising one or more of radar device, a laser device, a LiDAR device, a microwave doppler radar motion sensor device, and an ultrasonic sensor, the object sensing device configured to sense the external objects in the rear facing direction,
the controller in communication with the object sensor device, the controller further configured to:
control the one or more notification devices to provide at least one of the one or more of the first notifications and the one or more second notifications based on sensed data from the object sensor device.

7. The vehicle of claim 1, further comprising an object sensor device comprising one or more of radar device, a laser device, a LiDAR device, a microwave doppler radar motion sensor device, and an ultrasonic sensor, the object sensing device configured to sense the external objects in the rear facing direction,
the controller in communication with the object sensor device, the controller further configured to one or more of:
use sensed data from the object sensor device to detect the external object;
use the sensed data from the object sensor device to detect the external object in place of detecting the external object using the images from the long-range camera; and
use the sensed data from the object sensor device to detect whether the external object is in the first zone or the second zone in place of relying on the stereoscopic images.

8. The vehicle of claim 1, further comprising at least one notification device of the one or more notification devices.

9. The vehicle of claim 1, further comprising a communication interface,
wherein at least one notification device, of the one or more notification devices, is external to the vehicle, and
wherein the controller is further configured to control the at least one notification device to provide at least one of the one or more first notifications and the one or more second notifications via the communication interface.

10. The vehicle of claim 1, further comprising a communication interface,
wherein the controller is further configured to communicate, via the communication interface, with a second vehicle proximal the vehicle, the second vehicle being one or more of similar to, and same as, the vehicle.

11. The vehicle of claim 9, wherein the controller is further configured to one or more of, via the communication interface:
transmit, to the second vehicle, information regarding the external objects
receive, from the second vehicle, respective information regarding the external objects; and
form one or more of a local network and a machine learning network with the second vehicle to assist each other in external object detection.

12. The vehicle of claim 1, further comprising one or more of an accelerometer, a gyroscope and a barometric pressure sensor, wherein the controller is further configured to use data from one or more of the accelerometer, the gyroscope and the barometric pressure sensor to assist with stabilizing one or more of the images and the stereoscopic images.

13. The vehicle of claim 1, wherein the controller is further configured to:
control the one or more notification devices to provide the one or more first notifications and the one or more second notifications in a training mode.

14. The vehicle of claim 1, further comprising one or more of: a bicycle: a tricycle; a quadracycle, an all-terrain vehicle, a motorcycle; an e-bike; an electric vehicle; a farming vehicle; farming machinery; a construction vehicle; and construction machinery.

15. A device comprising:
a housing mountable to a vehicle;
a long-range camera positioned in the housing to image external objects in a rear-facing direction when the housing is mounted to the vehicle;
a stereoscopic camera positioned in the housing to image the external objects in the rear-facing direction when the housing is mounted to the vehicle, the long-range camera having a focal length longer than a respective focal length of the stereoscopic camera;
a communication interface; and
a controller in the housing, the controller in communication with the long-range camera and the stereoscopic camera, the controller in further communication with one or more notification devices via the communication interface, the controller configured to:
detect, using images from the long-range camera, an external object in the rear-facing direction;
in response to detecting the external object, using the images from the long-range camera, process stereoscopic images from the stereoscopic camera to determine when the external object is located within a first zone or a second zone extending in the rear-facing direction, the second zone being closer to the stereoscopic camera than the first zone;
in response to determining that the external object is located within the first zone, control the one or more notification devices to provide one or more first notifications associated with a first urgency level;
in response to determining that the external object is located within the second zone, control, via the communication interface, the one or more notification devices to provide one or more second notifications associated with a second urgency level greater than the first urgency level
wherein the controller is further configured to one or more of:
determine, using the images from the long-range camera, a type of the external object, wherein the stereoscopic images from the stereoscopic camera are processed, or not processed, to determine when the external object is located within the first zone or the second zone, depending on the type of the external object; and determine, using the images from the long-range camera, the type of the external object; and control a respective size of one or more of the first zone and the second zone, depending on the type of the external object.

16. The device of claim 15, wherein the stereoscopic camera comprises a two-camera stereoscopic system.

17. The device of claim 15, further comprising a light, in the housing, the light facing in the rear-facing direction when the housing is mounted to the vehicle, wherein the controller is further configured to:

in response to determining that the external object is located within the second zone, control the light to flash to provide a notification to a driver of the external object.

18. The device of claim 15, wherein the controller is further configured to, in response to determining that the external object is located within the second zone, one or more of:

store the stereoscopic images at a memory; and extract given information from the stereoscopic images and store the given information at the memory, the given information comprising one or more of, when the external object comprises a respective vehicle: a license plate number of the respective vehicle; details of the respective vehicle; and respective images of one or more a driver of the respective vehicle and passengers of the respective vehicle.

19. The device of claim 15, wherein the controller is further configured to:

determine, using the stereoscopic images from the stereoscopic camera, one or more of: a velocity of the external object; an acceleration of the external object; a trajectory of the external object, and an estimated time of impact of the external object with the vehicle; and control the one or more notification devices to provide at least one of the one or more first notifications and the one or more second notifications as a function of one or more of: the velocity, the acceleration, trajectory and the estimated time of impact.

20. The device of claim 15, further comprising an object sensor device, in the housing, the object sensor device comprising one or more of radar device, a laser device, a LiDAR device, a microwave doppler radar motion sensor device, and an ultrasonic sensor, the object sensing device configured to sense the external objects in the rear facing direction, the controller in communication with the object sensor device, the controller further configured to:

control the one or more notification devices to provide at least one of the one or more of the first notifications and the one or more second notifications based on sensed data from the object sensor device.

21. The device of claim 15, further comprising an object sensor device, in the housing, the object sensor device comprising one or more of radar device, a laser device, a LiDAR device, a microwave doppler radar motion sensor device, and an ultrasonic sensor, the object sensing device configured to sense the external objects in the rear facing direction, the controller in communication with the object sensor device, the controller further configured to one or more of:

use sensed data from the object sensor device to detect the external object;

use the sensed data from the object sensor device to detect the external object in place of detecting the external object using the images from the long-range camera; and use the sensed data from the object sensor device to detect whether the external object is in the first zone or the second zone in place of relying on the stereoscopic images.

22. The device of claim 15, wherein the controller is further configured to communicate, via the communication interface, with a second vehicle proximal the vehicle, the second vehicle being one or more of similar to, and same as, the vehicle.

23. The device of claim 15, wherein the controller is further configured to one or more of, via the communication interface:

transmit, to the second vehicle, information regarding the external objects receive, from the second vehicle, respective information regarding the external objects; and form one or more of a local network and a machine learning network with the second vehicle to assist each other in external object detection.

24. The device of claim 15, further comprising, in the housing, one or more of an accelerometer, a gyroscope and a barometric pressure sensor, wherein the controller is further configured to use data from one or more of the accelerometer, the gyroscope and the barometric pressure sensor to assist with stabilizing one or more of the images and the stereoscopic images.

25. The device of claim 15, wherein the controller is further configured to:

control the one or more notification devices to provide the one or more first notifications and the one or more second notifications in a training mode.

* * * * *